A1

(12) United States Patent
Wang

(10) Patent No.: US 11,930,295 B2
(45) Date of Patent: Mar. 12, 2024

(54) HANDLING OF NON-VCL NAL UNITS IN PICTURE UNIT CONSTRUCTION

(71) Applicant: Lemon Inc., Grand Cayman (KY)

(72) Inventor: Ye-Kui Wang, San Diego, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/477,221

(22) Filed: Sep. 16, 2021

(65) Prior Publication Data

US 2022/0086431 A1 Mar. 17, 2022

Related U.S. Application Data

(60) Provisional application No. 63/079,933, filed on Sep. 17, 2020.

(51) Int. Cl.
*H04N 7/01* (2006.01)
*H04N 19/105* (2014.01)
*H04N 19/132* (2014.01)
*H04N 19/169* (2014.01)
*H04N 19/176* (2014.01)
*H04N 19/46* (2014.01)

(52) U.S. Cl.
CPC ............ *H04N 7/01* (2013.01); *H04N 19/105* (2014.11); *H04N 19/132* (2014.11); *H04N 19/176* (2014.11); *H04N 19/188* (2014.11); *H04N 19/46* (2014.11)

(58) Field of Classification Search
None
See application file for complete search history.

(56) References Cited

U.S. PATENT DOCUMENTS

| 9,521,393 B2 | 12/2016 | Wang et al. |
| 9,621,919 B2 | 4/2017 | Wang et al. |
| 9,648,352 B2 | 5/2017 | Wang |

(Continued)

FOREIGN PATENT DOCUMENTS

| JP | 2020537367 A | 12/2020 |
| JP | 2022518367 A | 3/2022 |

(Continued)

OTHER PUBLICATIONS

"Information Technology—Coded Representation of Immersive Media—Part 3: Versatile Video Coding" ISO/IEC ITC 1/SC 29 /WG 11 N 18692, Text of ISO/IEC CD 23090-3, ISO/IEC JTC 1/SC 29/WG 11, Jul. 12, 2019.

(Continued)

*Primary Examiner* — Chikaodili E Anyikire
(74) *Attorney, Agent, or Firm* — Perkins Coie LLP

(57) ABSTRACT

Systems, methods and apparatus for processing visual media data are described. One example method includes performing a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

18 Claims, 12 Drawing Sheets

1100

Performing a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

1102

(56) References Cited

U.S. PATENT DOCUMENTS

| | | | |
|---|---|---|---|
| 9,819,945 | B2 | 11/2017 | Wang et al. |
| 9,894,370 | B2 | 2/2018 | Wang et al. |
| 10,063,867 | B2 | 8/2018 | Wang |
| 10,178,397 | B2 | 1/2019 | Wang et al. |
| 10,582,201 | B2 | 3/2020 | Wang et al. |
| 10,645,404 | B2 | 5/2020 | Wang et al. |
| 2016/0182927 | A1* | 6/2016 | Denoual .......... H04N 21/85406 725/109 |
| 2017/0347109 | A1 | 11/2017 | Hendry et al. |
| 2019/0014162 | A1* | 1/2019 | Denoual .............. H04N 19/186 |
| 2020/0169751 | A1* | 5/2020 | Thomas ................ H04N 19/39 |
| 2020/0244942 | A1 | 7/2020 | Maze et al. |
| 2020/0245041 | A1* | 7/2020 | Maze ................. H04N 21/8133 |
| 2020/0304820 | A1* | 9/2020 | Hannuksela ..... H04N 21/85406 |
| 2020/0389676 | A1 | 12/2020 | Denoual et al. |
| 2021/0194946 | A1* | 6/2021 | Hannuksela ......... H04N 21/816 |
| 2022/0014827 | A1* | 1/2022 | Denoual .............. H04N 21/845 |
| 2022/0086386 | A1 | 3/2022 | Wang |
| 2022/0086387 | A1 | 3/2022 | Wang |
| 2022/0086457 | A1 | 3/2022 | Wang |
| 2022/0094909 | A1 | 3/2022 | Hannuksela et al. |
| 2022/0217355 | A1* | 7/2022 | Ouedraogo .......... H04N 19/134 |
| 2023/0025332 | A1* | 1/2023 | Denoual ................ H04N 21/84 |

FOREIGN PATENT DOCUMENTS

| | | |
|---|---|---|
| WO | 2015011108 A1 | 1/2015 |
| WO | 2017172783 A1 | 10/2017 |
| WO | 2018173498 A1 | 9/2018 |
| WO | 2020120833 A1 | 6/2020 |
| WO | 2020141248 A1 | 7/2020 |
| WO | 2020141258 A1 | 7/2020 |
| WO | 2020146665 A1 | 7/2020 |
| WO | 2020185878 A1 | 9/2020 |
| WO | 2021122850 A1 | 6/2021 |
| WO | 2021136880 A1 | 7/2021 |
| WO | 2022059495 A1 | 3/2022 |

OTHER PUBLICATIONS

Versatile Video Coding, ITU-T Telecommunication Standardization Sector of ITU, Series H: Audiovisual and Multimedia Systems, Infrastructure of Audiovisual Services—Coding of Moving Video, Aug. 2020. Recommendation ITU-T H.266.

Wien et al. "Standardization Status of Immersive Video Coding,"IEEE Journal on Emerging and Selected Topics in Circuits and Systems, US, IEEE, Feb. 13, 2019, 9(1):5-17, https://ieeexplore.ieee.org/stamp/stamp.jsp?tp=&arnumber=8641398.

Non Final Office Action from U.S. Appl. No. 17/476,885 dated Nov. 18, 2022.

Hannuksela et al. "VVC Subpictures in ISO/IEC 14496-15," 129 MPEG Meeting, Jan. 13-17, 2020, Brussels, BE, ISO/IEC JTC 1/SC 29/WG 11, MPEG 2020/M52209, retrieved from the internet Jan. 8, 2020.

Pettersson et al. "AHG17: On NAL Unitl Type Table," Joint Video Experts Team (JVET) of ITU-T SG 16 WP 3 and ISO/IEC JTC 1/SC 29/WG 11, 16th Meeting, Geneva, CH, Oct. 1-11, 2019, document JVET-P0363, 2019.

Sjoberg et al. "AHG9: Picture Header Enabled Flag," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0426, 2020.

Wang, Ye-Kui. "AHG9/AHG8/AHG12: Some General HLS Syntax Cleanups," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0113, 2020.

Extended European Search Report from European Patent Application No. 21197100.7 dated Feb. 2, 2022 (8 pages).

Extended European Search Report from European Patent Application No. 21197161.9 dated Feb. 2, 2022 (11 pages).

Extended European Search Report from European Patent Application No. 21197212.0 dated Feb. 11, 2022 (9 pages).

Extended European Search Report from European Patent Application No. 21197224.5 dated Feb. 11, 2022 (11 pages).

Boyce et al. ""HEVC Additional Supplemental Enhancement Information (Draft 4)."" Joint Collaborative Team on Video Coding (JCT-VC)of Itu-T Sg 16 WP 3 and Iso/Iec Jtc 1/SC 29/WG 1129th Meeting: Macao, CN, Oct. 19-25, 2017, document JCTVC-AC1005, 2017.

Boyce et al. ""Versatile Supplemental Enhancement Information Messages for Coded Video Bitstreams (Draft 5),"" Joint Video Experts Team (JVET)of ITU-T SG 16 WP 3 and ISO/IEC JTC 1/SC 29/WG 1118th Meeting: by teleconference, Apr. 15-24, 2020, document JVET-S2007, 2020.

Bross et al. ""Versatile Video Coding (Draft 10),"" Joint Video Experts Team (JVET)of ITU-T SG 16 WP 3 and ISO/IEC JTC 1/SC 29/WG 1119th Meeting: by teleconference, Jun. 22-Jul. 1, 2020, document JVET-S2001, 2020.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

"Information Technology—Coding of Audio-Visual Objects—Part 15: Carriage of Network Abstraction Layer (NAL) Unit Structured Video in the ISO Base Media File Format—Amendment 2: Carriage of VVC and EVC in ISOBMFF" ISO/IEC 14496-15:2019(E) Amendment 2, ISO/IEC JTC 1/SC 29/WG 11, 2020, N19454.

"Information Technology—Coded Representation of Immersive Media—Part 3: Versatile Video Coding" ISO/IEC JTC 1/SC 29 /WG 11 N 18692, Text of ISO/IEC CD 23090-3, ISO/IEC JTC 1/SC 29/WG 11, Jul. 12, 2019.

"Information Technology—High Efficiency Coding and Media Delivery in Heterogeneous Environments—Part 12: Image File Format—Amendment 3: Support for VVC, EVC, Slideshows and Other Improvements," ISO/IEC 23008-12:2017(E) Amendment 3, ISO/IEC JTC1/SC 29/WG 11, 2020. N19460.

"Versatile Supplemental Enhancement Information Messages for Coded Video Bitstreams," Series H: Audiovisual and Multimedia Systems: Infrastructure of Audiovisual Services—Coding of Moving Video, ITU-T Telecommunication Standardization Sector of ITU, H.274, Aug. 2020.

Non Final Office Action from U.S. Appl. No. 17/477,060 dated Dec. 7, 2023.

\* cited by examiner

HANDLING OF NON-VCL NAL UNITS IN PICTURE UNIT CONSTRUCTION

CROSS REFERENCE TO RELATED APPLICATIONS

Under the applicable patent law and/or rules pursuant to the Paris Convention, this application is made to timely claims the priority to and benefits of U.S. Provisional Patent Application No. 63/079,933, filed on Sep. 17, 2020. For all purposes under the law, the entire disclosure of the aforementioned application is incorporated by reference as part of the disclosure of this application.

TECHNICAL FIELD

This patent document relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of a video or an image according to a file format.

In one example aspect, a method for processing visual media data is disclosed. The method includes performing a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

In another example aspect, another method for processing visual media data is disclosed. The method includes performing a conversion between visual media data and a visual media file that includes one or more tracks that store one or more bitstreams of the visual media data according to a format rule; wherein the one or more bitstreams include coded subpictures of the visual media data, and wherein the format rule specifies that a container of boxes of subpicture entity groups indicating rules for processing the coded subpictures is included in a file-level box.

In yet another example aspect, a video processing apparatus is disclosed. The video processing apparatus comprises a processor configured to implement above-described methods.

In yet another example aspect, a method of storing visual media data to a file including one or more bitstreams is disclosed. The method corresponds to above-described methods and further includes storing the one or more bitstream to a non-transitory computer-readable recording medium.

In yet another example aspect, a computer readable medium that stores a bitstream is disclosed. The bitstream is generated according to above-described methods.

In yet another example aspect, a video processing apparatus for storing a bitstream is disclosed, wherein the video processing apparatus is configured to implement above-described methods.

In yet another example aspect, a computer readable medium on which a bitstream complies to a file format that is generated according to above-described methods is disclosed.

These, and other, features are described throughout the present document.

DETAILED DESCRIPTION

Figure 1:
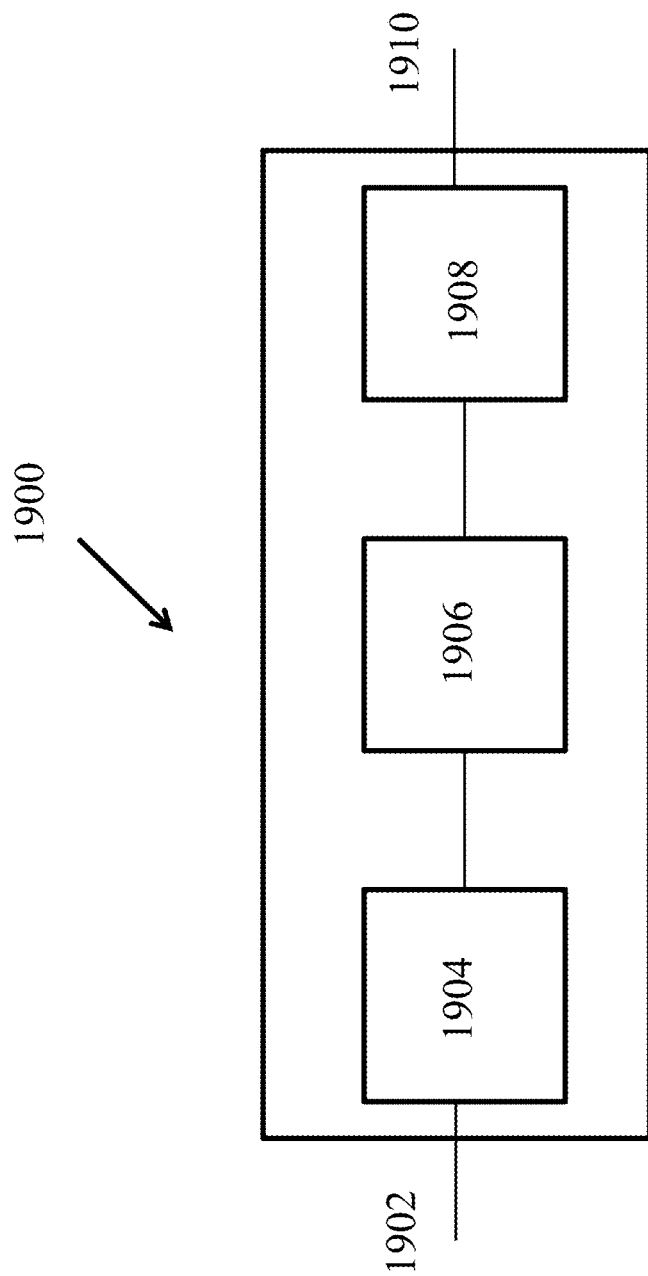
FIG. 1 is a block diagram of an example video processing system.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present document, editing changes are shown to text by strikethrough indicating cancelled text and highlight indicating added text (including boldface italic), with respect to the current draft of the VVC specification or ISOBMFF file format specification.

1. Initial Discussion

This document is related to video file format. Specifically, it is related to carriage of subpictures of a Versatile Video Coding (VVC) video bitstream in multiple tracks in a media file based on the ISO base media file format (ISOBMFF). The ideas may be applied individually or in various combination, for video bitstreams coded by any codec, e.g., the VVC standard, and for any video file format, e.g., the VVC video file format being developed.

2. Abbreviations

ACT adaptive colour transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CPB coded picture buffer
CRA clean random access
CRC cyclic redundancy check
CTB coding tree block
CTU coding tree unit
CU coding unit
CVS coded video sequence
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
IRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. Video Coding Introduction

3.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

3.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format in ISO/IEC 14496-15 ("Information technology—Coding of audio-visual objects—Part 15: Carriage of network abstraction layer (NAL) unit structured video in the ISO base media file format"), would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format in ISO/IEC 23008-12 ("Information technology—High efficiency coding and media delivery in heterogeneous environments—Part 12: Image File Format"), would be needed.

The VVC video file format, the file format for storage of VVC video content based on ISOBMFF, is currently being developed by MPEG. The latest draft specification of the VVC video file format is included in MPEG output document N19454 ("Information technology—Coding of audio-visual objects—Part 15: Carriage of network abstraction layer (NAL) unit structured video in the ISO base media file format—Amendment 2: Carriage of VVC and EVC in ISOBMFF", July 2020).

The VVC image file format, the file format for storage of image content coded using VVC, based on ISOBMFF, is currently being developed by MPEG. The latest draft specification of the VVC image file format is included in MPEG output document N19460 ("Information technology—High efficiency coding and media delivery in heterogeneous environments—Part 12: Image File Format—Amendment 3: Support for VVC, EVC, slideshows and other improvements", July 2020).

3.3. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.4. Picture Partitioning and Subpictures in VVC 3.4.1. Picture Partitioning in VVC In VVC, A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

3.4.2. Subpicture Concept and Functionality

Figure 8:
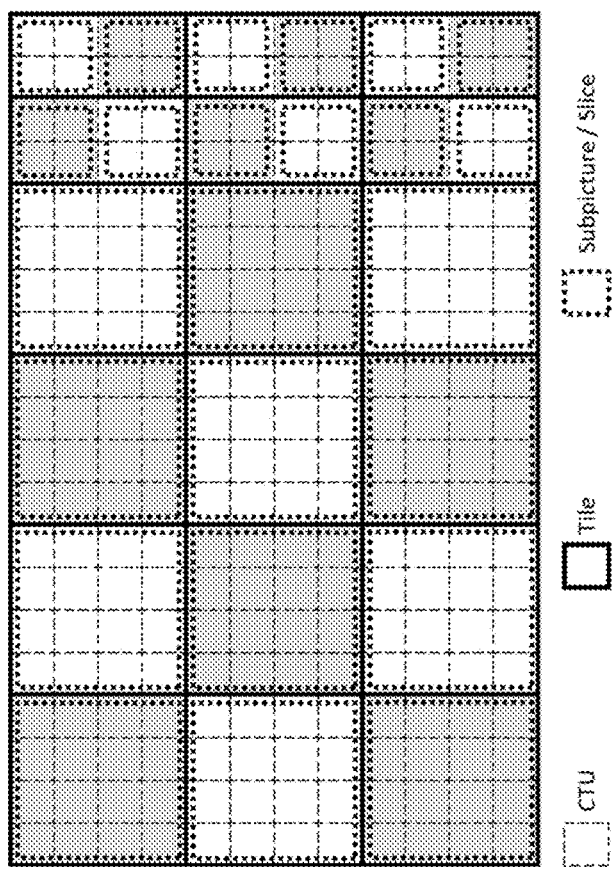
FIG. 8 shows a picture partitioned into 18 tiles, 24 slices and 24 subpictures.

In VVC, each subpicture consists of one or more complete rectangular slices that collectively cover a rectangular region of the picture, e.g., as shown in FIG. 8. A subpicture may be either specified to be extractable (i.e., coded independently of other subpictures of the same picture and of earlier pictures in decoding order) or not extractable. Regardless of whether a subpicture is extractable or not, the encoder can control whether in-loop filtering (including deblocking, SAO, and ALF) is applied across the subpicture boundaries individually for each subpicture.

Functionally, subpictures are similar to the motion-constrained tile sets (MCTSs) in HEVC. They both allow independent coding and extraction of a rectangular subset of a sequence of coded pictures, for use cases like viewport-dependent 360° video streaming optimization and region of interest (ROI) applications.

In streaming of 360° video, a.k.a. omnidirectional video, at any particular moment only a subset (i.e., the current viewport) of the entire omnidirectional video sphere would be rendered to the user, while the user can turn his/her head anytime to change the viewing orientation and consequently the current viewport. While it is desirable to have at least some lower-quality representation of the area not covered by the current viewport available at the client and ready to be rendered to the user just in case the user suddenly changes his/her viewing orientation to anywhere on the sphere, a high-quality representation of the omnidirectional video is only needed for the current viewport that is being rendered to the user at any given moment. Splitting the high-quality representation of the entire omnidirectional video into subpictures at an appropriate granularity enables such an optimization as shown in FIG. 8 with 12 high-resolution subpictures on the left-hand side and the remaining 12 subpictures of the omnidirectional video in lower resolution on the right-hand side.

Figure 9:
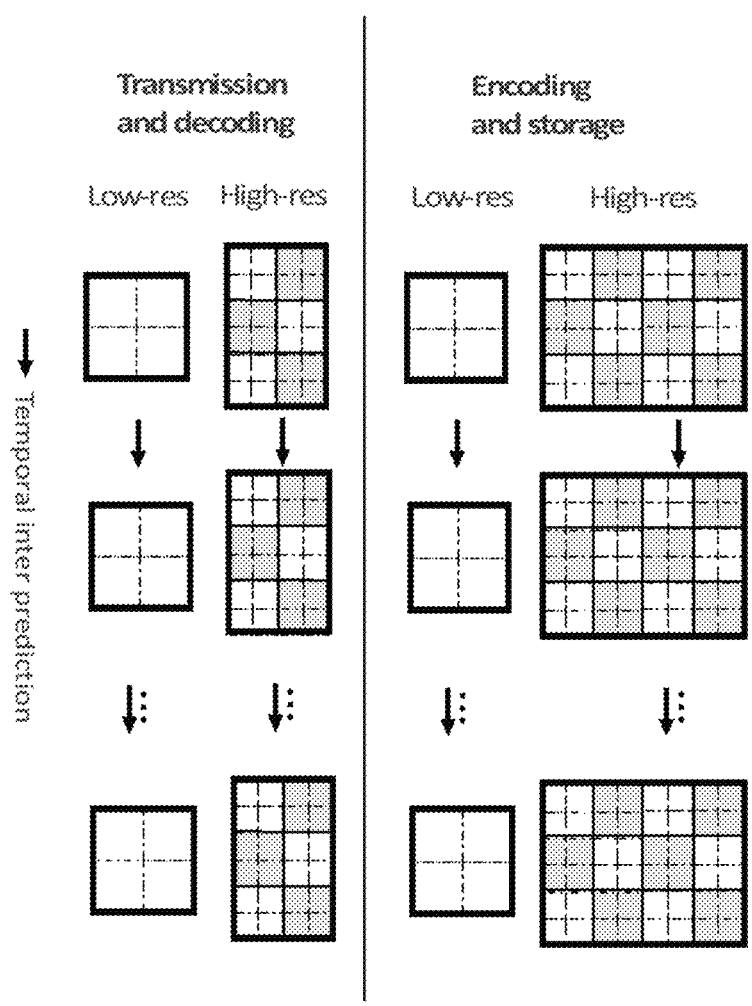
FIG. 9 A typical subpicture-based viewport-dependent 360° video delivery scheme.

Another typical subpicture-based viewport-dependent 360° video delivery scheme is shown in FIG. 9, wherein only a higher-resolution representation of the full video consists of subpictures, while a lower-resolution representation of the full video does not use subpictures and can be coded with less frequent RAPs than the higher-resolution representation. The client receives the full video in the lower-resolution while for the higher-resolution video, the client only receives and decodes the subpictures that cover the current viewport.

3.4.3. Differences Between Subpictures and MCTSs

There are several important design differences between subpictures and MCTSs. First, the subpictures feature in VVC allows motion vectors of a coding block pointing outside of the subpicture even when the subpicture is extractable by applying sample padding at subpicture boundaries in this case, similarly as at picture boundaries. Second, additional changes were introduced for the selection and derivation of motion vectors in the merge mode and in the decoder side motion vector refinement process of VVC. This allows higher coding efficiency compared to the non-normative motion constraints applied at encoder-side for MCTSs. Third, rewriting of SHs (and PH NAL units, when present) is not needed when extracting of one or more extractable subpictures from a sequence of pictures to create a sub-bitstream that is a conforming bitstream. In sub-bitstream extractions based on HEVC MCTSs, rewriting of SHs is needed. Note that in both HEVC MCTSs extraction and VVC subpictures extraction, rewriting of SPSs and PPSs is needed. However, typically there are only a few parameter sets in a bitstream, while each picture has at least one slice, therefore rewriting of SHs can be a significant burden for application systems. Fourth, slices of different subpictures within a picture are allowed to have different NAL unit types. This is the feature often referred to as mixed NAL unit types or mixed subpicture types within a picture, discussed in more detail below. Fifth, VVC specifies HRD and level definitions for subpicture sequences, thus the conformance of the sub-bitstream of each extractable subpicture sequence can be ensured by encoders.

3.4.4. Mixed Subpicture Types within a Picture

In AVC and HEVC, all VCL NAL units in a picture need to have the same NAL unit type. VVC introduces the option to mix subpictures with certain different VCL NAL unit types within a picture, thus providing support for random access not only at the picture level but also at the subpicture level. In VVC VCL NAL units within a subpicture are still required to have the same NAL unit type.

The capability of random accessing from IRAP subpictures is beneficial for 360° video applications. In viewport-dependent 360° video delivery schemes similar to the one shown in FIG. 9, the content of spatially neighboring viewports largely overlaps, i.e. only a fraction of subpictures in a viewport is replaced by new subpictures during a viewport orientation change, while most subpictures remain in the viewport. Subpicture sequences that are newly introduced into the viewport must begin with IRAP slices but significant reduction in overall transmission bit rate can be achieved when the remaining subpictures are allowed to carry out inter-prediction at viewport changes.

The indication of whether a picture contains just a single type of NAL units or more than one type is provided in the PPS referred to by the picture (i.e., using a flag called pps_mixed_nalu_types_in_pic_flag). A picture may consist of subpictures containing IRAP slices and subpictures containing trailing slices at the same time. A few other combinations of different NAL unit types within a picture are also allowed, including leading picture slices of NAL unit types RASL and RADL, which allows the merging of subpicture sequences with open-GOP and close-GOP coding structures extracted from different bitstreams into one bitstream.

3.4.5. Subpicture Layout and ID Signaling

The layout of subpictures in VVC is signaled in the SPS, thus constant within a CLVS. Each subpicture is signaled by the position of its top-left CTU and its width and height in number of CTUs, therefore ensuring that a subpicture covers a rectangular region of the picture with CTU granularity. The order in which the subpictures are signaled in the SPS determines the index of each subpicture within the picture.

Figure 10:
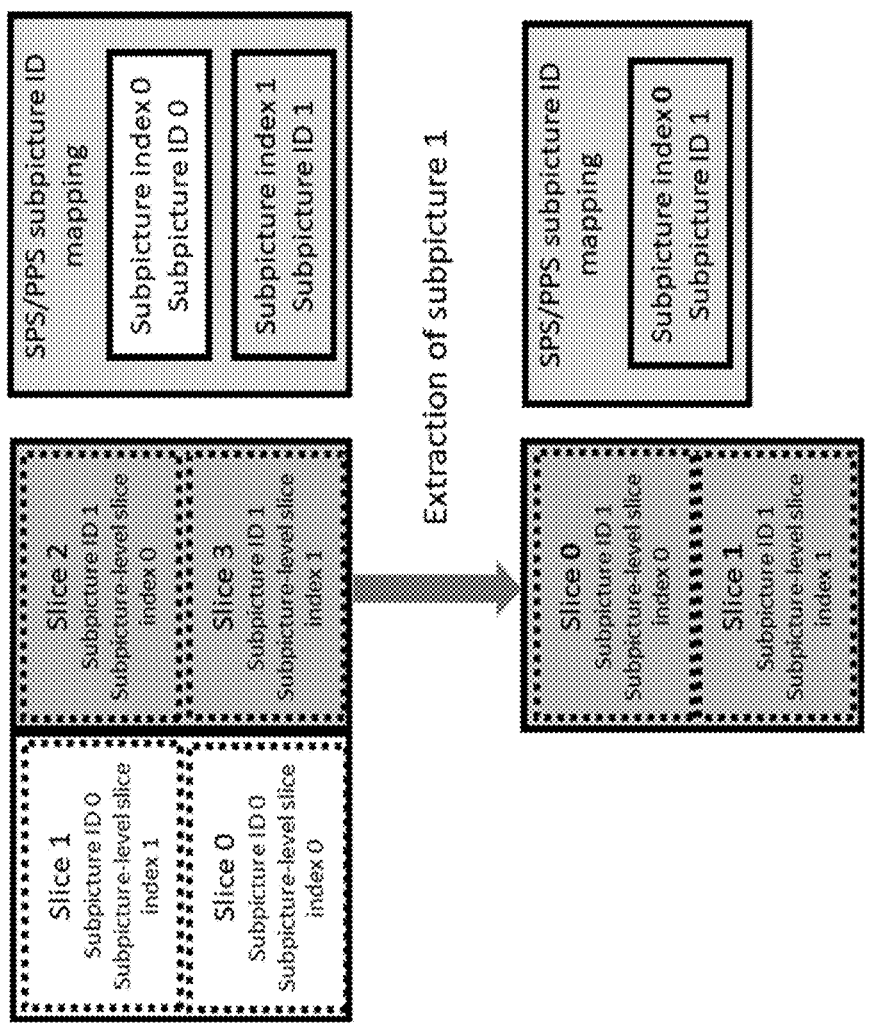
FIG. 10 shows an example of extraction of one subpicture from a bitstream containing two subpictures and four slices.

For enabling extraction and merging of subpicture sequences without rewriting of SHs or PHs, the slice addressing scheme in VVC is based on subpicture IDs and a subpicture-specific slice index to associate slices to subpictures. In the SH, the subpicture ID of the subpicture containing the slice and the subpicture-level slice index are signaled. Note that the value of subpicture ID of a particular subpicture can be different from the value of its subpicture index. A mapping between the two is either signaled in the SPS or PPS (but never both) or implicitly inferred. When present, the subpicture ID mapping needs to be rewritten or added when rewriting the SPSs and PPSs during the sub-picture sub-bitstream extraction process. The subpicture ID and the subpicture-level slice index together indicate to the decoder the exact position of the first decoded CTU of a slice within the DPB slot of the decoded picture. After sub-bitstream extraction, the subpicture ID of a subpicture remains unchanged while the subpicture index may change. Even when the raster-scan CTU address of the first CTU in a slice in the subpicture has changed compared to the value in the original bitstream, the unchanged values of subpicture ID and subpicture-level slice index in the respective SH would still correctly determine the position of each CTU in the decoded picture of the extracted sub-bitstream. FIG. 10 illustrates the usage of subpicture ID, subpicture index and subpicture-level slice index to enable subpicture extraction with an example containing two subpictures and four slices.

Similar to subpicture extraction, the signaling for subpictures allows merging several subpictures from different bitstreams into a single bitstream by only rewriting the SPSs and PPSs, provided that the different bitstreams are coordinately generated (e.g., using distinct subpicture IDs but otherwise mostly aligned SPS, PPS and PH parameters such as CTU size, chroma format, coding tools, etc.).

While subpictures and slices are independently signaled in the SPS and PPS, respectively, there are inherent reciprocal constraints between the subpicture and slice layouts in order to form a conformant bitstream. First, the presence of subpictures requires using rectangular slices and forbids raster-scan slices. Second, the slices of a given subpicture shall be consecutive NAL units in decoding order, which means that the subpicture layout constrains the order of coded slice NAL units within the bitstream.

3.5. Some Specifics of VVC Video File Format 3.5.1. Types of Tracks

The VVC video file format specifies the following types of video tracks for carriage of VVC bitstreams in ISOBMFF files:

a) VVC track:
   A VVC track represents a VVC bitstream by including NAL units in its samples and sample entries and possibly by referencing other VVC tracks containing other sublayers of the VVC bitstream and possibly by referencing VVC subpicture tracks. When a VVC track references VVC subpicture tracks, it is referred to as a VVC base track.

b) VVC non-VCL track:
   APSs, which carry ALF, LMCS, or scaling list parameters, and other non-VCL NAL units can be stored in and transmitted through a track that is separate from the track containing the VCL NAL units; this is the VVC non-VCL track.

c) VVC subpicture track:
   A VVC subpicture track contains either of the following:
      A sequence of one or more VVC subpictures.
      A sequence of one or more complete slices forming a rectangular area.
   A sample of a VVC subpicture track contains either of the following:
      One or more complete subpictures as specified in ISO/IEC 23090-3 that are contiguous in decoding order.
      One or more complete slices as specified in ISO/IEC 23090-3 that form a rectangular area and are contiguous in decoding order.

The VVC subpictures or slices included in any sample of a VVC subpicture track are contiguous in decoding order.
> NOTE: VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, segment by segment. This way, redundant transmission of APSs and other non-VCL NAL units can be avoided.

3.5.2. Overview of Rectangular Regions Carried in a VVC Bitstream

This document provides support for describing rectangular regions composed of either:
- A sequence of one or more VVC subpictures that are contiguous in decoding order, or
- A sequence of one or more complete slices that forms a rectangular area and that are contiguous in decoding order.

A rectangular region covers a rectangle without holes. Rectangular regions within a picture do not overlap with each other.

Rectangular regions can be described through rectangular region visual sample group description entries (i.e., instances of RectangularRegionGroupEntry) with rect_region_flag equal to 1.

If each sample of a track consists of NAL units of only one rectangular region, SampleToGroupBox of type 'trif' can be used to associate samples to the rectangular region, but this SampleToGroupBox of type 'trif' can be omitted if the default sample grouping mechanism is used (i.e., when the version of the SampleGroupDescriptionBox of type 'trif' is equal to or greater than 2). Otherwise, samples, NAL units, and rectangular regions are associated with each other through SampleToGroupBoxes of type 'nalm' and grouping type parameter equal to 'trif' and SampleGroupDescriptionBox of type 'nalm'. A RectangularRegionGroupEntry describes:
- a rectangular region,
- coding dependencies between this rectangular region and other rectangular regions.

Each RectangularRegionGroupEntry is assigned a unique identifier, called groupID. This identifier can be used to associate NAL units in a sample to a particular RectangularRegionGroupEntry. Positioning and size of rectangular regions are identified using luma sample coordinates.

When used with movie fragments, RectangularRegionGroupEntry can be defined for the duration of the movie fragment, by defining a new SampleGroupDescriptionBox in the track fragment box as defined in clause 8.9.4 of ISO/IEC 14496-12. However, there shall not be any RectangularRegionGroupEntry in a track fragment that has the same groupID as a RectangularRegionGroupEntry already defined.

The base region used in the RectangularRegionGroupEntry is the picture to which the NAL units in a rectangular region associated with this rectangular region group entry belongs. If there is any change in the base region size in consecutive samples (e.g. in case of reference picture resampling (RPR) or SPS resize), samples should be associated with different RectangularRegionGroupEntry entries reflecting their respective base region size.

NAL units mapped to a rectangular region may either be carried in a VVC track, as usual, or in a separate track called VVC subpicture track.

3.5.3. Reconstructing a Picture Unit from a Sample in a VVC Track Referencing VVC Subpicture Tracks A sample of a VVC track is resolved to an access unit that contains the following NAL units in the order of the bullets:
- The AUD NAL unit, if any, when present (and the first NAL unit) in the sample.
- When the sample is the first sample of a sequence of samples associated with the same sample entry, the parameter set and SEI NAL units contained in the sample entry, if any.
- The NAL units present in the sample up to and including the PH NAL unit.
- The content of the time-aligned (in decoding time) resolved sample from each referenced VVC subpicture track in the order specified in the 'spor' sample group description entry mapped to this sample, excluding all VPS, DCI, SPS, PPS, AUD, PH, EOS, and EOB NAL units, if any. The track references are resolved as specified below.
  > NOTE 1: If the referenced VVC subpicture track is associated with a VVC non-VCL track, the resolved sample of the VVC subpicture track contains the non-VCL NAL unit(s), if any, of the time-aligned sample in the VVC non-VCL track.
- The NAL units that follow the PH NAL unit in the sample.
  > NOTE 2: The NAL units that follow the PH NAL unit in the sample could include suffix SEI NAL units, suffix APS NAL units, an EOS NAL unit, an EOB NAL unit, or reserved NAL units that are allowed after the last VCL NAL unit.

The 'subp' track reference indices of a 'spor' sample group description entry are resolved as follows:
- If the track reference points to a track ID of a VVC subpicture track, the track reference is resolved to the VVC subpicture track.
- Otherwise (the track reference points to an 'alte' track group), the track reference is resolved to any of the tracks of the 'alte' track group. If a particular track reference index value was resolved to a particular track in the previous sample, it shall be resolved in the current sample to either of the following:
  - the same particular track, or
  - any other track in the same 'alte' track group that contains a sync sample that is time-aligned with the current sample.
  > NOTE 3: The VVC subpicture tracks in the same 'alte' track group are necessarily independent of any other VVC subpicture tracks referenced by the same VVC base track to avoid decoding mismatches and could therefore be constrained as follows:
  > - All the VVC subpicture tracks contain VVC subpictures.
  > - The subpicture boundaries are like picture boundaries.
  > - Loop filtering is turned off across subpicture boundaries.

If a reader selects VVC subpicture tracks containing VVC subpictures with a set of subpicture ID values that is the initial selection or differs from the previous selection, the following steps may be taken:
- The 'spor' sample group description entry is studied to conclude whether a PPS or SPS NAL unit needs to be changed.
  > NOTE: An SPS change is only possible at the start of a CLVS.

If the 'spor' sample group description entry indicates that start code emulation prevention bytes are present before or within the subpicture IDs in the containing NAL unit, an RBSP is derived from the NAL unit (i.e., start code emulation prevention bytes are removed). After the overriding in the next step, start code emulation prevention is re-done.

The reader uses the bit position and subpicture ID length information in the 'spor' sample group entry to conclude which bits are overwritten to update the subpicture IDs to the selected ones.

When the subpicture ID values of a PPS or SPS are initially selected, the reader needs to rewrite the PPS or SPS, respectively, with the selected subpicture ID values in the reconstructed access unit.

When the subpicture ID values of a PPS or SPS are changed compared to the previous PPS or SPS (respectively) with the same PPS ID value or SPS ID value (respectively), the reader needs to include a copy of that previous PPS and SPS (if the PPS or SPS with that same PPS or SPS ID value, respectively, is not present in the access unit otherwise) and rewrite the PPS or SPS (respectively) with the updated subpicture ID values in the reconstructed access unit.

3.5.4. Subpicture Order Sample Group

3.5.4.1. Definition

This sample group is used in VVC base tracks, i.e., in VVC tracks with 'subp' track referencing to VVC subpicture tracks. Each sample group description entry indicates the subpictures or slices of a coded picture in decoding order, where each index of the track reference of type 'subp' indicates one or more subpictures or slices that are contiguous in decoding order.

To ease PPS or SPS rewriting in response to subpicture selection, each sample group description entry may contain:

an indication of whether selected subpicture IDs should be changed in PPS or SPS NAL units;
the length (in bits) of subpicture ID syntax elements;
the bit position of subpicture ID syntax elements in the containing RBSP;
a flag indicating whether start code emulation prevention bytes are present before or within subpicture IDs;
the parameter set ID of the parameter set containing the subpicture IDs.

3.5.4.2. Syntax

```
aligned(8) class VvcSubpicOrderEntry( ) extends
VisualSampleGroupEntry('spor')
{
    unsigned int(1) subpic_id_info_flag;
    unsigned int(15) num_subpic_ref_idx;
    for (i = 0; i < num_subpic_ref_idx; i++)
        unsigned int(16) subp_track_ref_idx;
    if (subpic_id_info_flag) {
        unsigned int(4) subpic_id_len_minus1;
        unsigned int(12) subpic_id_bit_pos;
        unsigned int(1) start_code_emul_flag;
        unsigned int(1) pps_subpic_id_flag;
        if (pps_subpic_id_flag)
            unsigned int(6) pps_id;
        else {
            unsigned int(1) sps_subpic_id_flag;
            unsigned int(4) sps_id;
            bit(1) reserved = 0;
        }
    }
}
```

3.5.4.3. Semantics subpic_id_info_flag equal to 0 specifies that the subpicture ID values provided in the SPSs and/or PPSs are correct for the indicated set of subp_track_ref_idx values and thus no rewriting of SPSs or PPSs is required. subpic_info_flag equal to 1 specifies that SPSs and/or PPSs may need rewriting to indicate the subpictures corresponding to the set of subp_track_ref_idx values.

num_subpic_ref_idx specifies the number of reference indices of subpicture tracks or track groups of subpicture tracks referenced by the VVC track.

subp_track_ref_idx, for each value of i, specifies a 'subp' track reference index of the i-th list of one or more subpictures or slices to be included in the VVC bitstream reconstructed from the VVC track.

subpic_id_len_minus1 plus 1 specifies the number of bits in subpicture identifier syntax elements in PPS or SPS, whichever is referenced by this structure.

subpic_id_bit_pos specifies the bit position starting from 0 of the first bit of the first subpicture ID syntax element in the referenced PPS or SPS RBSP.

start_code_emul_flag equal to 0 specifies that start code emulation prevention bytes are not present before or within subpicture IDs in the referenced PPS or SPS NAL unit. start_code_emul_flag equal to 1 specifies that start code emulation prevention bytes may be present before or within subpicture IDs in the referenced PPS or SPS NAL unit.

pps_subpic_id_flag, when equal to 0, specifies that the PPS NAL units applying to the samples mapped to this sample group description entry do not contain subpicture ID syntax elements. pps_subpic_id_flag, when equal to 1, specifies that the PPS NAL units applying to the samples mapped to this sample group description entry contain subpicture ID syntax elements.

pps_id, when present, specifies the PPS ID of the PPS applying to the samples mapped to this sample group description entry.

sps_subpic_id_flag, when present and equal to 0, specifies that the SPS NAL units applying to the samples mapped to this sample group description entry do not contain subpicture ID syntax elements and the subpicture ID values are inferred. sps_subpic_id_flag, when present and equal to 1, specifies that the SPS NAL units applying to the samples mapped to this sample group description entry contain subpicture ID syntax elements.

sps_id, when present, specifies the SPS ID of the SPS applying to the samples mapped to this sample group description entry.

3.5.5. Subpicture Entity Groups

3.5.5.1. General

Subpicture entity groups are defined providing level information indicating conformance of a merged bitstream out of several VVC subpicture tracks.

NOTE: VVC base tracks provides another mechanism for merging VVC subpicture tracks.

Implicit reconstruction process requires modification of parameter sets. The subpicture entity groups give guidance to ease parameter set generation for the reconstructed bitstreams.

When the coded subpictures within the group that are to be jointly decoded are interchangeable, i.e. the player selects a number of active tracks from a group of sample-wise subpictures with the same level contribution, the Subpic- CommonGroupBox indicates the combinatorial rules and the level_idc of a resulting combination when decoded jointly.

When there are coded subpictures with different properties, e.g. different resolution, which are selected to be jointly decoded, the SubpicMultipleGroupsBox indicates the combinatorial rules and the level_idc of a resulting combination when decoded jointly.

All the entity_id values included in the subpicture entity groups shall identify VVC subpicture tracks. When present, SubpicCommonGroupBox and SubpicMultipleGroupsBox shall be contained in the GroupsListBox in the movie-level MetaBox and shall not be contained in file-level or track-level MetaBoxes.

3.5.5.2. Syntax of Subpicture Common Group Box

```
aligned(8) class SubpicCommonGroupBox extends
EntityToGroupBox('acgl',0,0)
{
    unsigned int(32) level_idc;
    unsigned int(32) num_active_tracks;
}
```

3.5.5.3. Semantics of Subpicture Common Group Box
  level_idc specifies the level to which any selection of num_active_tracks entities among the entity group conforms.
  num_active_tracks specifies the number of tracks for which the value of level_idc is provided.

3.5.5.4. Syntax of Subpicture Multiple Groups Box

```
aligned(8) class SubpicMultipleGroupsBox extends
EntityToGroupBox('amgl',0,0)
{
    unsigned int(32) level_idc;
    unsigned int(32) num_subgroup_ids;
    subgroupIdLen = (num_subgroup_ids >= (1 << 24)) ? 32 :
        (num_subgroup_ids >= (1 << 16)) ? 24 :
        (num_subgroup_ids >= (1 << 8)) ? 16 : 8;
    for (i = 0; i < num_entities_in_group; i++)
        unsigned int(subgroupIdLen) track_subgroup_id[i];
    for (i = 0; i < num_subgroup_ids; i++)
        unsigned int(32) num_active_tracks[i];
}
```

3.5.5.5. Semantics
  level_idc specifies the level to which the combination of selecting any num_active_tracks[i] tracks among the subgroup with ID equal to i for all values of i in the range of 0 to num_subgroup_ids−1, inclusive, conforms.
  num_subgroup_ids specifies the number of separate subgroups, each identified by the same value of track_subgroup_id[i]. Different subgroups are identified by different values of track_subgroup_id[i].
  track_subgroup_id[i] specifies the subgroup ID for the i-th track in this entity group. subgroup ID values shall range from 0 to num_subgroup_ids−1, inclusive.
  num_active_tracks[i] specifies the number of tracks among the subgroup with ID equal to i that is documented in level_idc.

4. Example Technical Problems Addressed by Disclosed Technical Solutions

The latest designs of the VVC video file format regarding the carriage of subpictures in a VVC bitstreams in multiple tracks have the following problems:

1) A sample of a VVC subpicture track contains either of the following: A) One or more complete subpictures as specified in ISO/IEC 23090-3 that are contiguous in decoding order; B) One or more complete slices as specified in ISO/IEC 23090-3 that form a rectangular area and are contiguous in decoding order.
   However, the following issue exists:
   a. It would make more sense to also require a VVC subpicture track to cover a rectangular area when it contains subpictures, similarly as when it contains slices.
   b. It would make more sense to require the subpictures or slices in a VVC subpicture track to be motion-constrained, i.e., extractable or self-contained.
   c. Why not allow a VVC subpicture track to contain a set of subpictures that form a rectangular region but are not continuous in decoding order in the original bitstream but if this track itself is decoded then these subpictures are continuous in decoding order? Shouldn't that be allowed, e.g., for a field of view (FOV) of a 360° video covered by some subpictures on the left and right boundaries of a projected picture?
2) In the reconstruction of a PU from a sample of a VVC base track and the time-aligned samples in a list of VVC subpicture tracks referenced by the VVC base track, the order of the non-VCL NAL units in the sample of the VVC base track is not clearly specified when the PH NAL unit is not present in the sample.
3) The subpicture order sample group mechanism ('spor') enables different order of the subpictures from the subpicture tracks in the reconstructed bitstream for different samples, and enables cases that need SPSs and/or PPS rewriting. However, it's not clear why either of these flexibilities is needed. Therefore, the 'spor' sample group mechanism is not needed and can be removed.
4) In the reconstruction of a PU from a sample of a VVC base track and the time-aligned samples in a list of VVC subpicture tracks referenced by the VVC base track, when the NAL units in the time-aligned sample of a VVC subpicture track are added to the PU, all VPS, DCI, SPS, PPS, AUD, PH, EOS, and EOB NAL units, if any, are excluded. However, what about OPI NAL units? What about SEI NAL units? Why are these non-VCL NAL units allowed to be present in the subpicture tracks? If there are present, is it OK to just through them away in bitstream reconstruction?
5) The container of the boxes of the two subpicture entity groups is specified as the movie-level MetaBox. However, only when the boxes are contained in the file-level MetaBox can the entity_id values of the entity group refer to track IDs.
6) The subpicture entity groups work for cases where the relevant subpicture information is consistent throughout the entire time duration of the tracks. However, this is not always the case. For example, what if different CVSs have different levels for a particular subpicture sequence? In that case, sample groups should be used instead, to carry essentially the same information, but allow certain information to differ for different samples (e.g., CVSs).

5. A Listing of Technical Solutions

To solve the above problems, and others, methods as summarized below are disclosed. The inventions should be considered as examples to explain the general concepts and should not be interpreted in a narrow way. Furthermore, these inventions can be applied individually or combined in any manner.

1) One or more of the following items are proposed on VVC subpicture tracks:
   a. Require a VVC subpicture track to cover a rectangular area when it contains subpictures.
   b. Require the subpictures or slices in a VVC subpicture track to be motion-constrained such that they can extracted, decoded, and presented without the presence of any of the subpictures or slices covering other areas.
      i. Alternatively, allow the subpictures or slices in a VVC subpicture track to be dependent in motion compensation on the subpictures or slices covering other areas, and consequently they cannot extracted, decoded, and presented without the presence of any of the subpictures or slices covering other areas.
   c. Allow a VVC subpicture track to contain a set of subpictures or slices that form a rectangular region but are not contiguous in decoding order in the original/entire VVC bitstream.
      This enables a field of view (FOV) of a 360° video covered by subpictures that are not contiguous in decoding order in the original/entire VVC bitstream, e.g., on the left and right boundaries of a projected picture, to be represented by a VVC subpicture track.
   d. Require that the order of the subpictures or slices in each sample of a VVC subpicture track shall be the same as the order of them in the original/entire VVC bitstream.
   e. Add an indication of whether the decoding order of the subpictures or slices in each sample of a VVC subpicture track is contiguous in the original/entire VVC bitstream.
      i. This indication is, e.g., signalled in the VVC base track sample entry description, or somewhere else.
      ii. Require that, when it is not indicated that the order of the subpictures or slices in each sample of a VVC subpicture track is contiguous in decoding order in the original/entire VVC bitstream, the subpictures or slices in the track shall not be merged with subpictures or slices in other VVC subpicture tracks. For example, in this case, it is disallowed to have a VVC based track referencing, through track reference of type 'subp', both this VVC subpicture track and another VVC subpicture track.

2) In the reconstruction of a PU from a sample of a VVC base track and the time-aligned samples in a list of VVC subpicture tracks referenced by the VVC base track through a track reference, the order of the non-VCL NAL units in the sample of the VVC base track is clearly specified regardless of whether there is a PH NAL unit in the sample.
   a. In one example, the set NAL units from the sample of the VVC base track to be placed in the PU before the NAL units in the VVC subpicture tracks is specified as follows: If there is at least one NAL unit in the sample with nal_unit_type equal to EOS_NUT, EOB_NUT, SUFFIX_APS_NUT, SUFFIX_SEI_NUT, FD_NUT, RSV_NVCL_27, UNSPEC_30, or UNSPEC_31 (a NAL unit with such a NAL unit type cannot precede the first VCL NAL unit in a picture unit), the NAL units in the sample up to and excluding the first NAL unit of these NAL units (with the above-mentioned nal_unit type) are placed in the PU before the NAL units in the VVC subpicture tracks, otherwise all NAL units in the sample are placed in the PU before the NAL units in the VVC subpicture tracks.
   b. In one example, the set NAL units from the sample of the VVC base track to be placed in the PU after the NAL units in the VVC subpicture tracks is specified as follows: All NAL units in the sample with nal_unit_type equal to EOS_NUT, EOB_NUT, SUFFIX_APS_NUT, SUFFIX_SEI_NUT, FD_NUT, RSV_NVCL_27, UNSPEC_30, or UNSPEC_31 are placed in the PU before the NAL units in the VVC subpicture tracks.

3) Allow a VVC track to refer to multiple (subpicture) tracks by using 'subp' track reference, and the order of reference indicates the decoding order of the subpictures in a bitstream reconstructed from the referenced VVC subpicture tracks.
   a. In the reconstruction of a PU from a sample of a VVC base track and the time-aligned samples in a list of VVC subpicture tracks referenced by the VVC base track, the samples of the reference subpicture tracks are processed in the order of the VVC subpicture tracks being referenced in the 'subp' track reference.

4) Disallow the presence of any AU-level or picture-level non-VCL NAL units in subpicture tracks, including AUD, DCI, OPI, VPS, SPS, PPS, PH, EOS, and EOB NAL units, and SEI NAL units containing AU-level and picture-level SEI messages only. An AU-level SEI message applies to one or more entire AUs. A picture-level SEI message applies to one or more entire pictures.
   a. Furthermore, in the reconstruction of a PU from a sample of a VVC base track and the time-aligned samples in a list of VVC subpicture tracks referenced by the VVC base track, all NAL units in the time-aligned sample of a VVC subpicture track are added to the PU, without discarding certain non-VCL NAL units.

5) In the reconstruction of a PU from a sample of a VVC base track and the time-aligned samples in a list of VVC subpicture tracks referenced by the VVC base track through a track reference, remove the use of the 'spor' sample group, and remove the description of the parameter sets rewriting process based on the 'spor' sample group.

6) Remove the specification of the 'spor' sample group.

7) It is specified that each 'subp' track reference index shall refer to either a track ID of a VVC subpicture track or a track group ID of a group of VVC subpicture tracks, nothing else.

8) To solve problem 5, the container of the boxes of the two subpicture entity groups is specified to be the file-level MetaBox as follows: When present, SubpicCommonGroupBox and SubpicMultipleGroupsBox shall be contained in the GroupsListBox in the file-level MetaBox and shall not be contained in MetaBoxes of other levels.

9) To solve problem 6, add two sample groups to carry similar information as carried by the two the subpicture entity groups, such that VVC file format would support cases where the relevant subpicture information is not consistent throughout the entire time duration of the tracks, e.g., when different CVSs have different levels for a particular subpicture sequence.

6. Embodiments

Below are some example embodiments for some of the invention aspects summarized above in Section 5, which can be applied to the standard specification for VVC video file format. The changed texts are based on the latest draft specification in MPEG output document N19454 ("Information technology—Coding of audio-visual objects—Part 15: Carriage of network abstraction layer (NAL) unit structured video in the ISO base media file format—Amendment 2: Carriage of VVC and EVC in ISOBMFF", July 2020). Most relevant parts that have been added or modified are highlighted in bold and Italic, and some of the deleted parts are marked with double brackets (e.g., [[a]] denotes deletion of the character, 'a'). There may be some other changes that are editorial in nature and thus not highlighted.

6.1. First Embodiment

This embodiment is for items 1a, 1b, and 1c.
6.1.1. Types of Tracks
This specification specifies the following types of video tracks for carriage of VVC bitstreams:
  a) VVC Track:
    A VVC track represents a VVC bitstream by including NAL units in its samples and/or sample entries, and possibly by associating other VVC tracks containing other layers and/or sublayers of the VVC bitstream through the 'vopi' and 'linf' sample groups or through the 'opeg' entity group, and possibly by referencing VVC subpicture tracks.
    When a VVC track references VVC subpicture tracks, it is also referred to as a VVC base track. A VVC base track shall not contain VCL NAL units and shall not be referred to by a VVC track through a 'vvcN' track reference.
  b) VVC Non-VCL Track:
    A VVC non-VCL track is a track that contains only non-VCL NAL units and is referred to by a VVC track through a 'vvcN' track reference.
    A VVC non-VCL track may contain APSs, which carry ALF, LMCS, or scaling list parameters, with or without other non-VCL NAL units, stored in and transmitted through a track that is separate from the track containing the VCL NAL units.
    A VVC non-VCL trac may also contain picture header NAL units, with or without APS NAL units, and with or without other non-VCL NAL units, stored in and transmitted through a track that is separate from the track containing the VCL NAL units.
  c) VVC Subpicture Track:
    A VVC subpicture track contains either of the following:
      A sequence of one or more VVC subpictures forming a rectangular area.
      A sequence of one or more complete slices forming a rectangular area.
    A sample of a VVC subpicture track contains either of the following:
      One or more complete subpictures as specified in ISO/IEC 23090-3 that [[are contiguous in decoding order]] form an extractable rectangular region, where an extractable rectangular region is rectangular region for which the decoding does not use any pixel value outside of the region for motion compensation.
      One or more complete slices as specified in ISO/IEC 23090-3 that form [[a]] an extractable rectangular region [[area and are contiguous in decoding order]].
    [[The VVC subpictures or slices included in any sample of a VVC subpicture track are contiguous in decoding order.]]
      NOTE: VVC non-VCL tracks and VVC subpicture tracks enable an optimal delivery of VVC video in streaming applications as follows. These tracks can each be carried in DASH representations of their own, and for decoding and rendering of a subset of the tracks, the DASH representations containing the subset of the VVC subpicture tracks as well as the DASH representation containing the non-VCL tracks can be requested by the client, segment by segment. This way, redundant transmission of APSs and other non-VCL NAL units can be avoided, and transmission of unnecessary subpictures can also be avoided.
6.1.2. Overview of Rectangular Regions Carried in a VVC Bitstream
This document provides support for describing rectangular regions composed of either:
  A sequence of one or more VVC subpictures that [[are contiguous in decoding order]] forms a rectangular region, or
  A sequence of one or more complete slices that forms a rectangular region [[area and that are contiguous in decoding order]].
A rectangular region covers a rectangle without holes. Rectangular regions within a picture do not overlap with each other.
. . .

6.2. Second Embodiment

This embodiment is for items 2, 2a, 2b, 3, 3a, 4, 4a, and 5.
6.2.1. Reconstructing a Picture Unit from a Sample in a VVC Track Referencing VVC Subpicture Tracks
A sample of a VVC track is resolved to [[an access unit]] a picture unit that contains the following NAL units in the order of the bullets:
  The AUD NAL unit, [[if any,]] when present [[(and the first NAL unit)]] in the sample.
  NOTE 1: When an AUD NAL unit is present in a sample, it is the first NAL unit in the sample.
  When the sample is the first sample of a sequence of samples associated with the same sample entry, the parameter set and SEI NAL units contained in the sample entry, if any.
  [[The NAL units present in the sample up to and including the PH NAL unit]] If there is at least one NAL unit in the sample with nal_unit_type equal to EOS_NUT, EOB_NUT, SUFFIX_APS_NUT, SUFFIX_SEI_NUT, FD_NUT, RSV_NVCL_27, UNSPEC_30, or UNSPEC_31 (a NAL unit with such a NAL unit type cannot precede the first VCL NAL unit in a picture unit), the NAL units in the sample up to and excluding the first of these NAL units, otherwise all NAL units in the sample.
  The content of the time-aligned (in decoding time) resolved sample from each referenced VVC subpicture track in the order of the VVC subpicture tracks being referenced in the 'subp' track reference [[specified in the 'spor' sample group description entry mapped to this sample, excluding all VPS, DCI, SPS, PPS, AUD, PH, EOS, and EOB NAL units, if any]]. The track references are resolved as specified below.

NOTE 2: If a referenced VVC subpicture track is associated with a VVC non-VCL track, the resolved sample of the VVC subpicture track contains the non-VCL NAL unit(s), if any, of the time-aligned sample in the VVC non-VCL track.

[[The NAL units that follow the PH NAL unit in the sample]] All NAL units in the sample with nal_unit_type equal to EOS_NUT, EOB_NUT, SUFFIX_APS_NUT, SUFFIX_SEI_NUT, FD_NUT, RSV_NVCL_27, UNSPEC_30, or UNSPEC_31.

[[NOTE 2: The NAL units that follow the PH NAL unit in the sample could include suffix SEI NAL units, suffix APS NAL units, an EOS NAL unit, an EOB NAL unit, or reserved NAL units that are allowed after the last VCL NAL unit.]]

The 'subp' track reference indices [[of a 'spor' sample group description entry]] are resolved as follows:

If the track reference points to a track ID of a VVC subpicture track, the track reference is resolved to the VVC subpicture track.

Otherwise (the track reference points to an 'alte' track group), the track reference is resolved to any of the tracks of the 'alte' track group, and if a particular track reference index value was resolved to a particular track in the previous sample, it shall be resolved in the current sample to either of the following:

the same particular track, or any other track in the same 'alte' track group that contains a sync sample that is time-aligned with the current sample.

NOTE 3: The VVC subpicture tracks in the same 'alte' track group are necessarily independent of any other VVC subpicture tracks referenced by the same VVC base track to avoid decoding mismatches and could therefore be constrained as follows:

All the VVC subpicture tracks contain VVC subpictures.

The subpicture boundaries are like picture boundaries.

[[Loop filtering is turned off across subpicture boundaries.

If a reader selects VVC subpicture tracks containing VVC subpictures with a set of subpicture ID values that is the initial selection or differs from the previous selection, the following steps may be taken:

The 'spor' sample group description entry is studied to conclude whether a PPS or SPS NAL unit needs to be changed.

NOTE: An SPS change is only possible at the start of a CLVS.

If the 'spor' sample group description entry indicates that start code emulation prevention bytes are present before or within the subpicture IDs in the containing NAL unit, an RBSP is derived from the NAL unit (i.e., start code emulation prevention bytes are removed). After the overriding in the next step, start code emulation prevention is re-done.

The reader uses the bit position and subpicture ID length information in the 'spor' sample group entry to conclude which bits are overwritten to update the subpicture IDs to the selected ones.

When the subpicture ID values of a PPS or SPS are initially selected, the reader needs to rewrite the PPS or SPS, respectively, with the selected subpicture ID values in the reconstructed access unit.

When the subpicture ID values of a PPS or SPS are changed compared to the previous PPS or SPS (respectively) with the same PPS ID value or SPS ID value (respectively), the reader needs to include a copy of that previous PPS and SPS (if the PPS or SPS with that same PPS or SPS ID value, respectively, is not present in the access unit otherwise) and rewrite the PPS or SPS (respectively) with the updated subpicture ID values in the reconstructed access unit.]]

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 2:
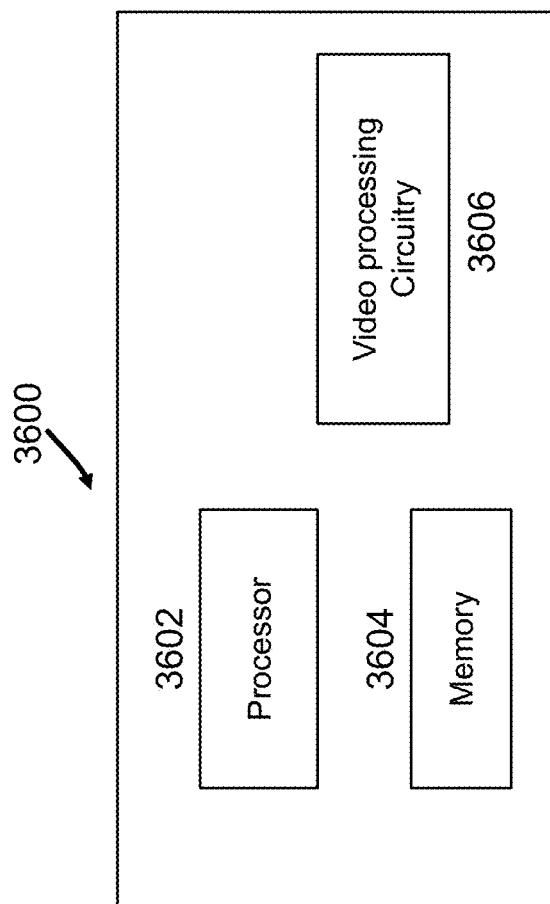
FIG. 2 is a block diagram of a video processing apparatus.
Figure 3:
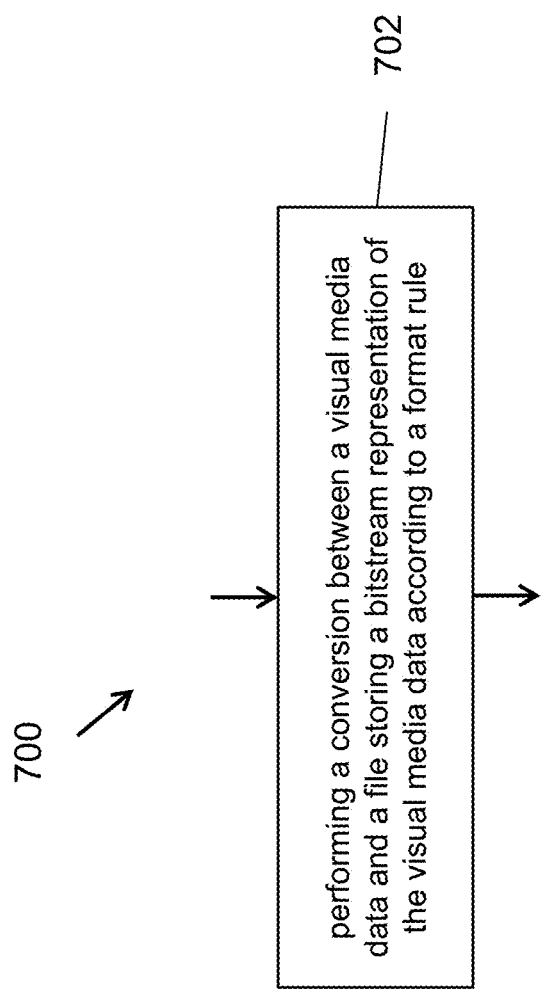
FIG. 3 is a flowchart for an example method of video processing.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein.

The video processing hardware 3606 may be used to implement, in hardware circuitry, some techniques described in the present document. In some embodiments, the video processing hardware 3606 may be at least partly included in the processor 3602, e.g., a graphics co-processor.

Figure 4:
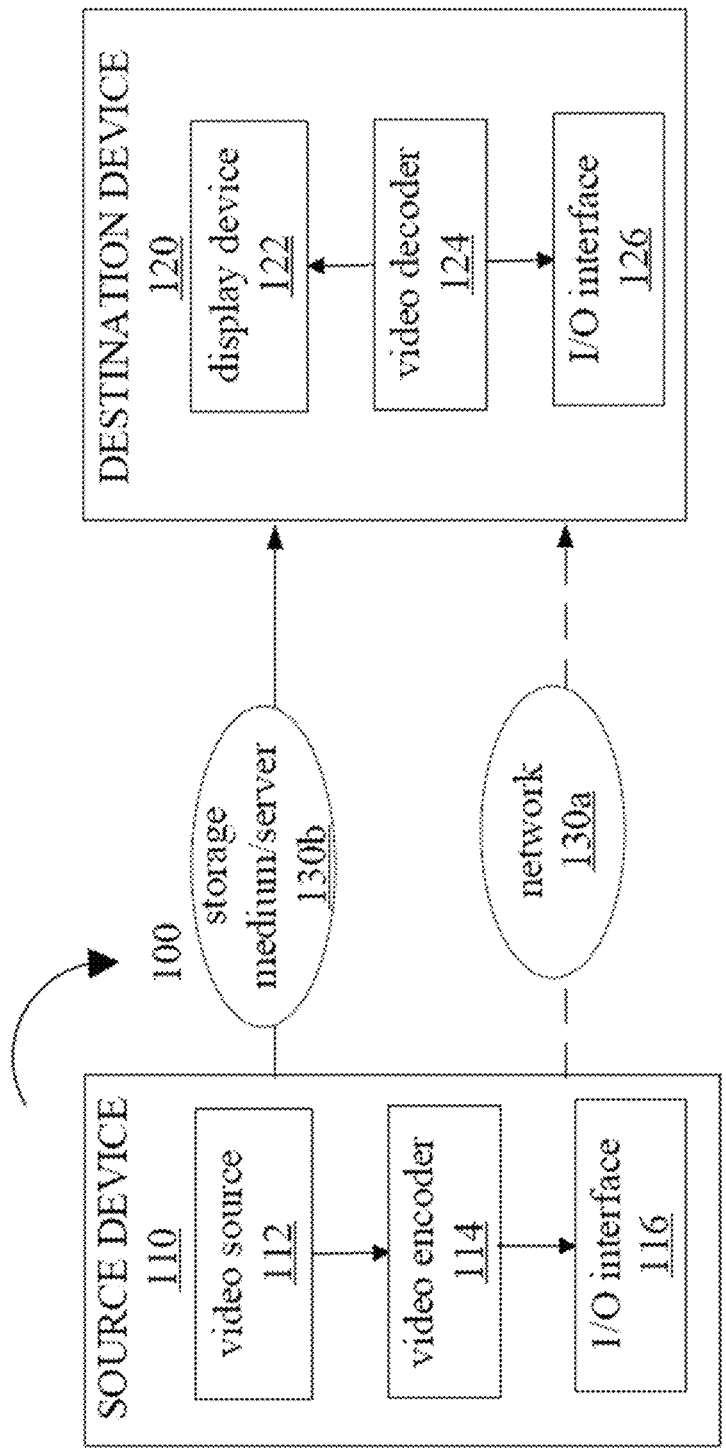
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 5:
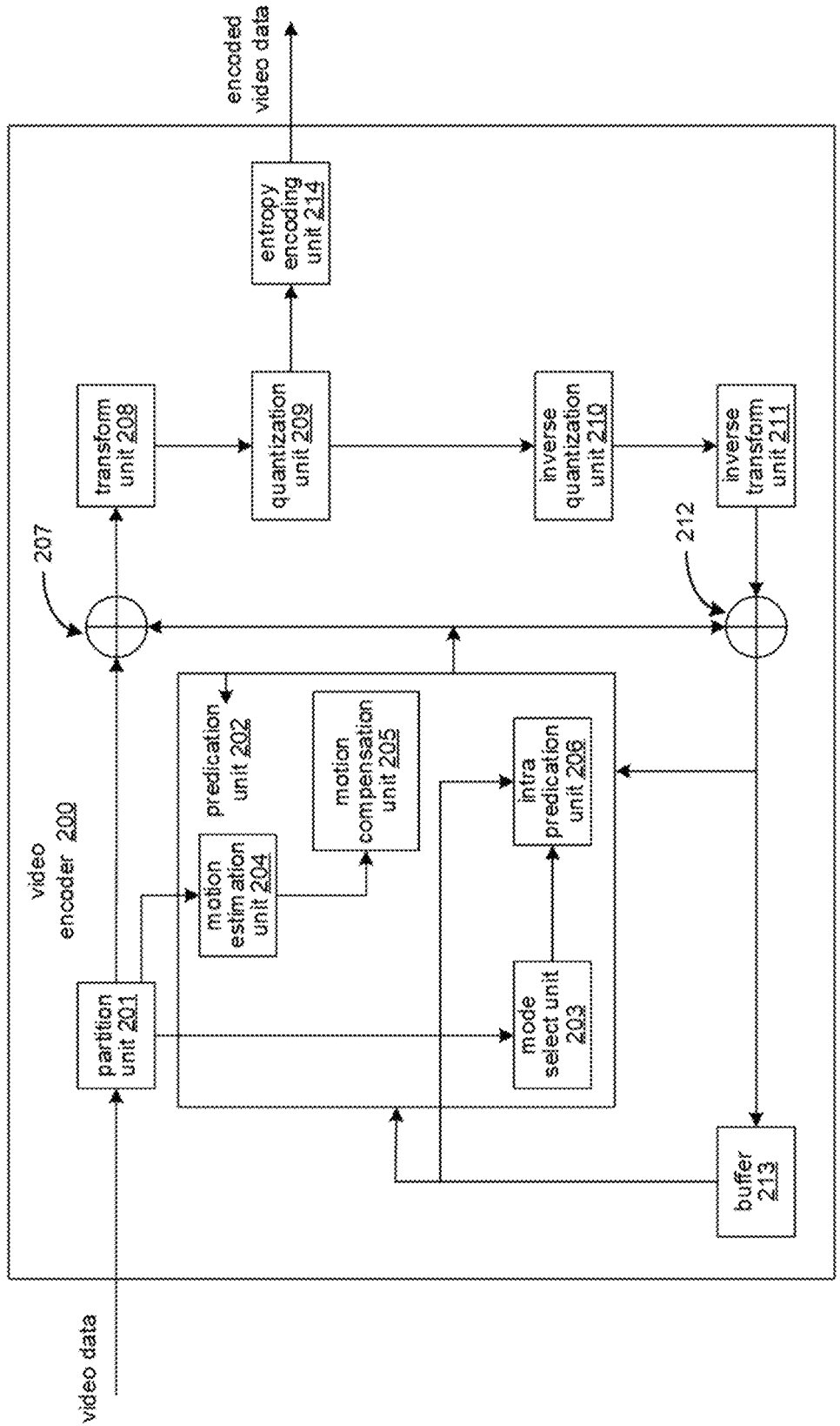
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
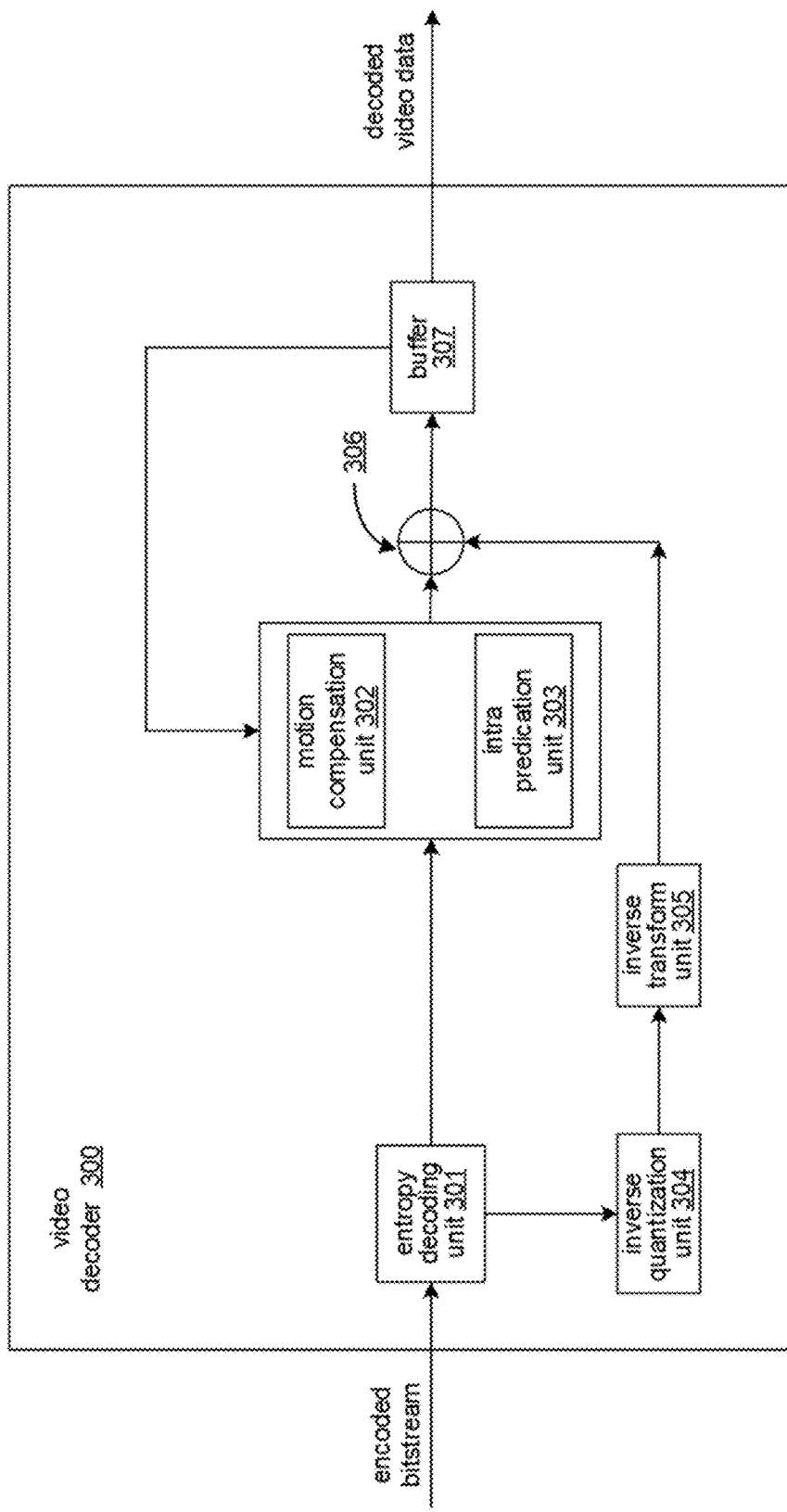
FIG. 6 is a block diagram that illustrates a decoder in accordance with some embodiments of the present disclosure.
Figure 7:
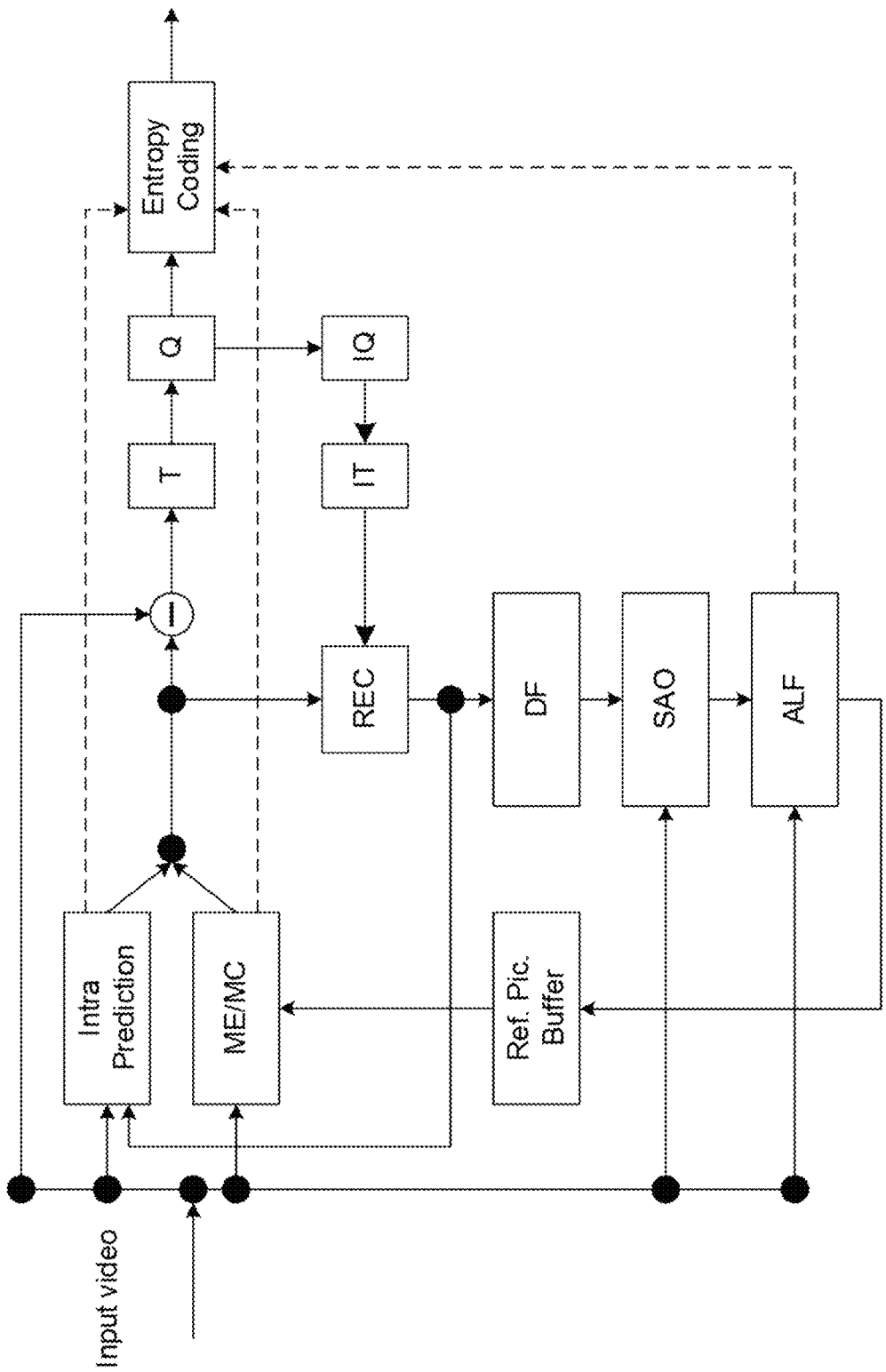
FIG. 7 shows an example of encoder block diagram.

FIG. 6 is a block diagram illustrating an example of video decoder 300 which may be video decoder 114 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided below. The following solutions show example embodiments of techniques discussed in the previous section (e.g., item 1).

1. A visual media processing method, comprising: performing a conversion between a visual media data and a file storing a bitstream representation of the visual media data according to a format rule; wherein the file comprises a track that includes data for a subpicture of the visual media data; and wherein the format rule specifies a syntax for the track.

2. The method of solution 1, wherein the format rule specifies that the track covers a rectangular area.

3. The method of solution 1, wherein the format rule specifies that subpictures or slices included in the track are independently extractable, decodable and presentable.

The following solutions show example embodiments of techniques discussed in the previous section (e.g., items 3, 4).

4. A visual media processing method, comprising: performing a conversion between a visual media data and a file storing a bitstream representation of the visual media data according to a format rule; wherein the file comprises a first track and/or one or more subpicture tracks; wherein the format rule specifies a syntax for the track and/or the one or more subpicture tracks.

5. The method of solution 4, wherein the format rule specifies that the track includes references to the one or more subpicture tracks.

6. The method of solution 4, wherein the format rule disallows inclusion of access unit level or picture-level non-video coding layer network abstraction layer units in the one or more subpicture tracks.

7. The method of solution 6, wherein the disallowed units include a decoding capability information structure, or a parameter set or operating point information or a header or an end of stream or an end of picture.

8. The method of any of solutions 1-7, wherein the conversion comprises generating a bitstream representation of the visual media data and storing the bitstream representation to the file according to the format rule.

9. The method of any of solutions 1-7, wherein the conversion comprises parsing the file according to the format rule to recover the visual media data.

10. A video decoding apparatus comprising a processor configured to implement a method recited in one or more of solutions 1 to 9.

11. A video encoding apparatus comprising a processor configured to implement a method recited in one or more of solutions 1 to 9.

12. A computer program product having computer code stored thereon, the code, when executed by a processor, causes the processor to implement a method recited in any of solutions 1 to 9.

13. A computer readable medium on which a bitstream representation complying to a file format that is generated according to any of solutions 1 to 9.

14. A method, apparatus or system described in the present document.

A second set of solutions provides example embodiments of techniques discussed in the previous section (e.g., items 2 and 4).

Figure 11:
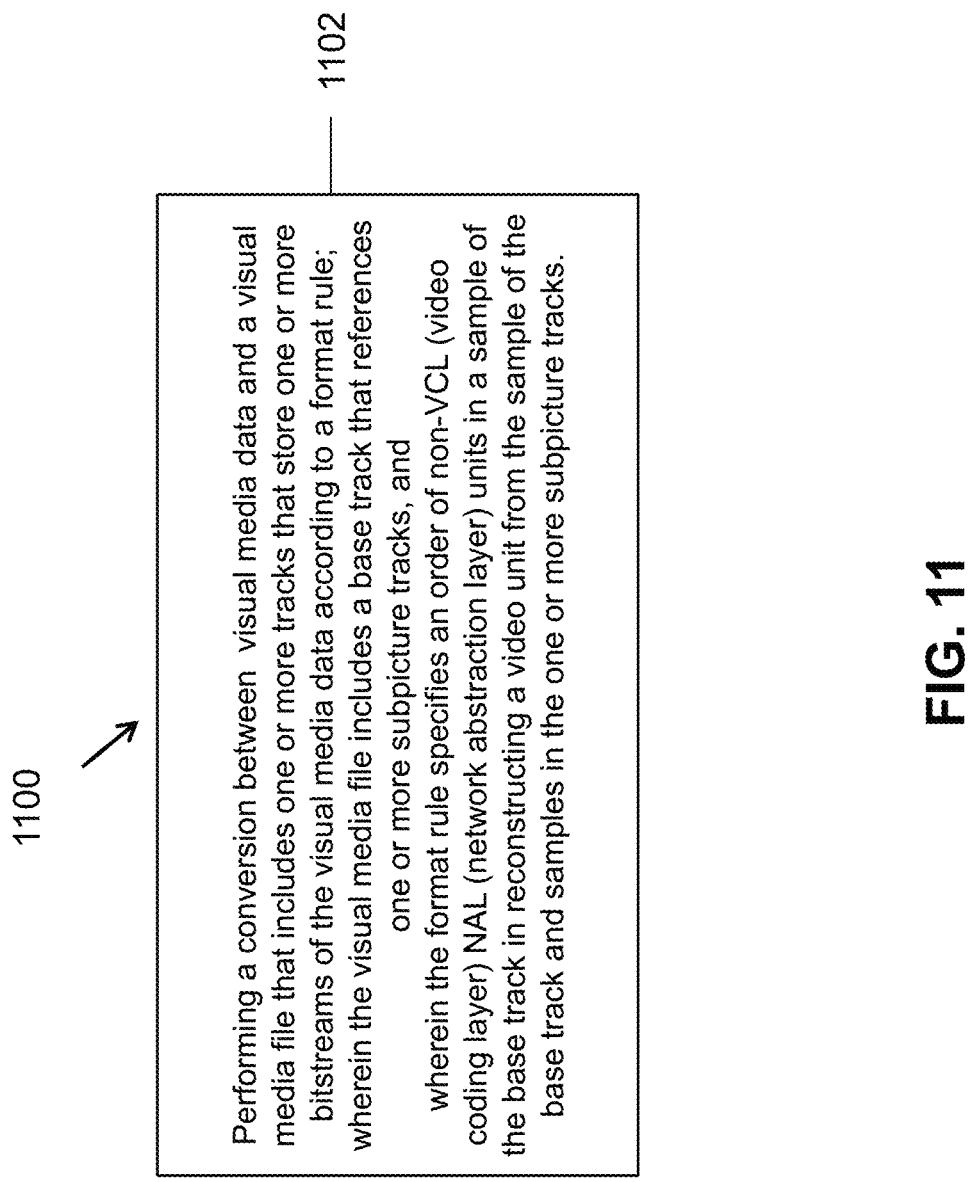
FIGS. 11 and 12 are flowcharts for example methods of processing visual media data based on some implementations of the disclosed technology.

1. A method of processing visual media data (e.g., method 1100 as shown in FIG. 11), comprising: performing 1102 a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

2. The method of solution 1, wherein the format rule specifies the order of the non-VCL NAL units regardless of a presence of a picture header NAL unit in the sample.

3. The method of solution 1, wherein the format rule specifies at least some of the non-VCL NAL units in the sample of the base track to be placed in the video unit before or after NAL units in the one or more subpicture track.

4. The method of solution 3, wherein the format rule further specifies that, in case that there is a set of one or more non-VCL NAL unit in the sample that has a NAL unit type that is equal to EOS_NUT, EOB_NUT, SUFFIX_APS_NUT, SUFFIX_SEI_NUT, FD_NUT, RSV_NVCL_27, UNSPEC_30, or UNSPEC_31, NAL units in the sample up to and excluding a first NAL unit of the set of the one or more non-VCL NAL units are placed in the video unit before the NAL units in the one or more subpicture tracks.

5. The method of solution 3, wherein the format rule further specifies that, in case that there is no non-VCL NAL unit in the sample that has a NAL unit type that is equal to EOS_NUT, EOB_NUT, SUFFIX_APS_NUT, SUFFIX_SELNUT, FD_NUT, RSV_NVCL_27, UNSPEC_30, or UNSPEC_31, all NAL units in the sample are placed in the video unit before the NAL units in the one or more subpicture tracks.

6. The method of solution 3, wherein is the format rule further specifies that, in case that there is at least one non-VCL NAL unit in the sample that has a NAL unit type that is equal to EOS_NUT, EOB_NUT, SUFFIX_APS_NUT, SUFFIX_SELNUT, FD_NUT, RSV_NVCL_27, UNSPEC_30, or UNSPEC_31, all NAL units in the sample are placed in the video unit after the NAL units in the one or more subpicture tracks.

7. The method of solution 1, wherein the format rule further specifies to disallow an inclusion of access unit level or picture-level non-video coding layer network abstraction layer units in the one or more subpicture tracks.

8. The method of solution 7, wherein the disallowed units include a NAL unit corresponding to access unit delimiter (AUD) NAL unit, decoding capability information (DCI) NAL unit, operating point information (OPI) NAL unit, a video parameter set (VPS) NAL unit, a sequence parameter set (SPS) NAL unit, a picture parameter set (PPS) NAL unit, picture header (PH) NAL unit, end of sequence (EOS) NAL unit, EOB (end of bitstream) NAL unit, or a supplemental enhancement information (SEI) NAL unit containing access unit level of picture-level SEI messages only.

9. The method of solution 8, wherein the format rule further specifies that all NAL units in the samples of the one or subpicture tracks are added to the video unit in reconstructing the video unit from the sample of the base track and the samples in the one or more subpicture tracks.

10. The method of any one of solutions 1-9, wherein the visual media data is processed by a versatile video coding (VVC), and the one or more tracks are VVC tracks.

11. The method of any one of solutions 1-10, wherein the conversion comprises generating the visual media file and storing the one or more bitstreams to the visual media file according to the format rule.

12. The method of any one of solutions 1-10, wherein the conversion comprises parsing the visual media file according to the format rule to reconstruct the one or more bitstreams.

13. An apparatus of processing visual media data, comprising a processor configured to implement a method comprising: performing a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

14. The apparatus of solution 13, wherein the format rule specifies the order of the non-VCL NAL units regardless of a presence of a picture header NAL unit in the sample.

15. The apparatus of solution 14, wherein the format rule specifies at least some of the non-VCL NAL units in the sample of the base track to be placed in the video unit before or after NAL units in the one or more subpicture track.

16. The apparatus of solution 15, wherein is the format rule further specifies that, in case that there is a set of one or more non-VCL NAL unit in the sample that has a NAL unit type that is equal to EOS_NUT, EOB_NUT, SUFFIX_APS_NUT, SUFFIX_SELNUT, FD_NUT, RSV_NVCL_27, UNSPEC_30, or UNSPEC_31, NAL units in the sample up to and excluding a first NAL unit of the one or more non-VCL NAL units are placed in the video unit before the NAL units in the one or more subpicture tracks.

17. The apparatus of solution 15, wherein the format rule further specifies that, in case that there is no non-VCL NAL unit in the sample that has a unit type that is equal to EOS_NUT, EOB_NUT, SUFFIX_APS_NUT, SUFFIX_SELNUT, FD_NUT, RSV_NVCL_27, UNSPEC_30, or UNSPEC_31, all NAL units in the sample are placed in the video unit before the NAL units in the one or more subpicture tracks.

18. The apparatus of solution 15, wherein the format rule further specifies that, in case that there is at least one non-VCL NAL unit in the sample that has a NAL unit type that is equal to EOS_NUT, EOB_NUT, SUFFIX_APS_NUT, SUFFIX_SELNUT, FD_NUT, RSV_NVCL_27, UNSPEC_30, or UNSPEC_31, all NAL units in the sample are placed in the video unit after the NAL units in the one or more subpicture tracks.

19. The apparatus of solution 13, wherein the format rule further specifies to disallow an inclusion of access unit level or picture-level non-video coding layer network abstraction layer units in the one or more subpicture tracks.

20. The apparatus of solution 19, wherein the disallowed units include a NAL unit corresponding to access unit delimiter (AUD) NAL unit, decoding capability information (DCI) NAL unit, operating point information (OPI) NAL unit, a video parameter set (VPS) NAL unit, a sequence parameter set (SPS) NAL unit, a picture parameter set (PPS) NAL unit, picture header (PH) NAL unit, end of sequence (EOS) NAL unit, EOB (end of bitstream) NAL unit, or a supplemental enhancement information (SEI) NAL unit containing access unit level of picture-level SEI messages only.

21. The apparatus of solution 20, wherein the format rule further specifies that all NAL units in the samples of the one or subpicture tracks are added to the video unit in reconstructing the video unit from the sample of the base track and the samples in the one or more subpicture tracks.

22. A non-transitory computer-readable storage medium storing instructions that cause a processor to: perform a conversion between visual media data and a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

23. A non-transitory computer-readable recording medium storing instructions that cause a processor to: generating a visual media file that includes one or more tracks that store one or more bitstreams of the visual media data according to a format rule; wherein the visual media file includes a base track that references one or more subpicture tracks, and wherein the format rule specifies an order of non-VCL (video coding layer) NAL (network abstraction layer) units in a sample of the base track in reconstructing a video unit from the sample of the base track and samples in the one or more subpicture tracks.

24. A video processing apparatus comprising a processor configured to implement a method recited in any one or more of solutions 1 to 12.

25. A method of storing visual media data to a file including one or more bitstreams, the method comprising a method recited in any one of solutions 1 to 12, and further including storing the one or more bitstream to a non-transitory computer-readable recording medium.

26. A computer readable medium storing program code that, when executed, causes a processor to implement a method recited in any one or more of solutions 1 to 12.

27. A computer readable medium that stores a bitstream generated according to any of the above described methods.

28. A video processing apparatus for storing a bitstream, wherein the video processing apparatus is configured to implement a method recited in any one or more of solutions 1 to 12.

29. A computer readable medium on which a bitstream complying to a file format that is generated according to any of solutions 1 to 12.

30. A method, apparatus or system described in the present document.

A third set of solutions provides example embodiments of techniques discussed in the previous section (e.g., items 8 and 9).

Figure 12:
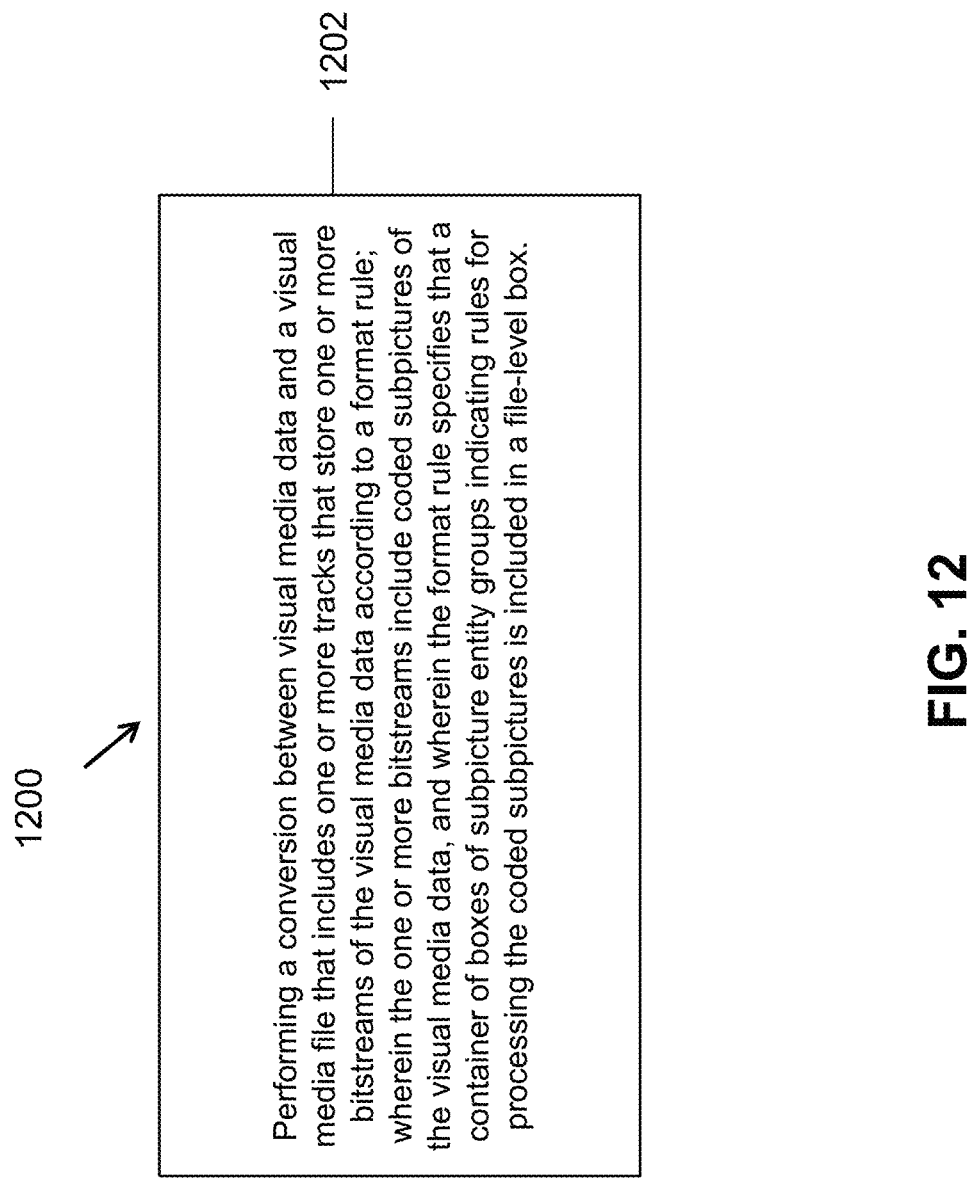

1. A method of processing video data (e.g., method 1200 as shown in FIG. 12), comprising: performing 1202 a conversion between visual media data and a visual media file that includes one or more tracks that store one or more bitstreams of the visual media data according to a format rule; wherein the one or more bitstreams include coded subpictures of the visual media data, and wherein the format rule specifies that a container of boxes of subpicture entity groups indicating rules for processing the coded subpictures is included in a file-level box.

2. The method of solution 1, wherein the format rule further specifies that the container of the boxes of the subpicture entity groups is not included in boxes at other levels than a file level.

3. The method of solution 1, wherein the subpicture entity groups include a first subpicture entity group that indicate the rules for processing the coded subpictures within a group.

4. The method of solution 1, wherein the subpicture entity groups include a second subpicture entity group that indicate the rules for processing the coded subpictures with different coding properties.

5. The method of solution 1, wherein the format rule further specifies to add sample groups to carry information as carried by the subpicture entity groups to support a case where subpicture information is inconsistent through an entire time duration of the track.

6. The method any one of solutions 1-5, wherein the visual media data is processed by a versatile video coding (VVC), and the one or more tracks are VVC tracks.

7. The method of any one of solutions 1-6, wherein the conversion comprises generating the visual media file and storing the one or more bitstreams to the visual media file according to the format rule.

8. The method of any one of solutions 1-6, wherein the conversion comprises parsing the visual media file according to the format rule to reconstruct the one or more bitstreams.

9. An apparatus of processing visual media data, comprising a processor configured to implement a method comprising: performing a conversion between visual media data and a visual media file that includes one or more tracks that store one or more bitstreams of the visual media data according to a format rule; wherein the one or more bitstreams include coded subpictures of the visual media data, and wherein the format rule specifies that a container of boxes of subpicture entity groups indicating rules for processing the coded subpictures is included in a file-level box.

10. The apparatus of solution 9, wherein the format rule further specifies that the container of the boxes of the subpicture entity groups is not included in boxes at other levels than a file level.

11. The apparatus of solution 9, wherein the subpicture entity groups include a first subpicture entity group that indicate the rules for processing the coded subpictures within a group.

12. The apparatus of solution 9, wherein the subpicture entity groups include a second subpicture entity group that indicate the rules for processing the coded subpictures with different coding properties.

13. The apparatus of solution 9, wherein the format rule further specifies to add sample groups to carry information as carried by the subpicture entity groups to support a case where subpicture information is inconsistent through an entire time duration of the track.

14. A non-transitory computer-readable recording medium storing instructions that cause a processor to: perform a conversion between visual media data and a visual media file that includes one or more tracks that store one or more bitstreams of the visual media data according to a format rule; wherein the one or more bitstreams include coded subpictures of the visual media data, and wherein the format rule specifies that a container of boxes of subpicture entity groups indicating rules for processing the coded subpictures is included in a file-level box.

15. The non-transitory computer-readable recording medium of solution 14, wherein the format rule further specifies that the container of the boxes of the subpicture entity groups is not included in boxes at other levels than a file level.

16. The non-transitory computer-readable recording medium of solution 14, wherein the subpicture entity groups include a first subpicture entity group that indicate the rules for processing the coded subpictures within a group.

17. The non-transitory computer-readable recording medium of solution 14, wherein the subpicture entity groups include a second subpicture entity group that indicate the rules for processing the coded subpictures with different coding properties.

18. The non-transitory computer-readable recording medium of solution 14, wherein the format rule further specifies to add sample groups to carry information as carried by the subpicture entity groups to support a case where subpicture information is inconsistent through an entire time duration of the track.

19. A non-transitory computer-readable recording medium storing a bitstream which is generated by a method performed by a video processing apparatus, wherein the method comprises: generating a visual media file that includes one or more tracks that store one or more bitstreams of the visual media data according to a format rule; wherein the one or more bitstreams include coded subpictures of the visual media data, and wherein the format rule specifies that a container of boxes of subpicture entity groups indicating rules for processing the coded subpictures is included in a file-level box.

20. The non-transitory computer-readable recording medium of solution 19, wherein the format rule further specifies that the container of the boxes of the subpicture entity groups is not included in boxes at other levels than a file level.

21. A video processing apparatus comprising a processor configured to implement a method recited in any one or more of solutions 1 to 8.

22. A method of storing visual media data to a file including one or more bitstreams, the method comprising a method recited in any one of solutions 1 to 8, and further including storing the one or more bitstream to a non-transitory computer-readable recording medium.

23. A computer readable medium storing program code that, when executed, causes a processor to implement a method recited in any one or more of solutions 1 to 8.

24. A computer readable medium that stores a bitstream generated according to any of the above described methods.

25. A video processing apparatus for storing a bitstream, wherein the video processing apparatus is configured to implement a method recited in any one or more of solutions 1 to 8.

26. A computer readable medium on which a bitstream complying to a file format that is generated according to any of solutions 1 to 8.

27. A method, apparatus or system described in the present document.

In the example solutions, the visual media data corresponds to video or images. In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
performing a conversion between visual media data and a visual media file that includes one or more tracks that store one or more bitstreams of the visual media data according to a format rule;
wherein the visual media file includes a base track that references one or more subpicture tracks,
wherein the format rule specifies an order of non-VCL (video coding layer) NAL (network abstraction layer) units in a sample of the base track in reconstructing a video unit from the sample of the base track and samples in the one or more subpicture tracks, and
wherein the format rule specifies at least some of the non-VCL NAL units in the sample of the base track to be placed in the video unit before or after NAL units in the one or more subpicture track;
wherein the format rule specifies the order of the non-VCL NAL units regardless of a presence of a picture header NAL unit in the sample.

2. The method of claim 1, wherein the format rule further specifies that, in case that there is a set of one or more non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, NAL units in the sample up to and excluding a first NAL unit of the set of the one or more non-VCL NAL units are placed in the video unit before the NAL units in the one or more subpicture tracks.

3. The method of claim 1, wherein the format rule further specifies that, in case that there is no non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, all NAL units in the sample are placed in the video unit before the NAL units in the one or more subpicture tracks.

4. The method of claim 1, wherein is the format rule further specifies that, in case that there is at least one non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, all NAL units in the sample are placed in the video unit after the NAL units in the one or more subpicture tracks.

5. The method of claim 1, wherein the format rule further specifies to disallow an inclusion of access unit level or picture-level non-video coding layer network abstraction layer units in the one or more subpicture tracks.

6. The method of claim 5, wherein the disallowed units include a NAL unit corresponding to access unit delimiter (AUD) NAL unit, decoding capability information (DCI) NAL unit, operating point information (OPI) NAL unit, a video parameter set (VPS) NAL unit, a sequence parameter set (SPS) NAL unit, a picture parameter set (PPS) NAL unit, picture header (PH) NAL unit, end of sequence (EOS) NAL unit, EOB (end of bitstream) NAL unit, or a supplemental enhancement information (SEI) NAL unit containing access unit level of picture-level SEI messages only.

7. The method of claim 6, wherein the format rule further specifies that all NAL units in the samples of the one or subpicture tracks are added to the video unit in reconstructing the video unit from the sample of the base track and the samples in the one or more subpicture tracks.

8. The method of claim 1, wherein the visual media data is processed by a versatile video coding (VVC), and the one or more tracks are VVC tracks.

9. The method of claim 1, wherein the conversion comprises generating the visual media file and storing the one or more bitstreams to the visual media file according to the format rule.

10. The method of claim 1, wherein the conversion comprises parsing the visual media file according to the format rule to reconstruct the one or more bitstreams.

11. An apparatus of processing visual media data, comprising a processor configured to implement a method comprising:
performing a conversion between visual media data and a visual media file that includes one or more tracks that store one or more bitstreams of the visual media data according to a format rule;
wherein the visual media file includes a base track that references one or more subpicture tracks,
wherein the format rule specifies an order of non-VCL (video coding layer) NAL (network abstraction layer) units in a sample of the base track in reconstructing a video unit from the sample of the base track and samples in the one or more subpicture tracks, and
wherein the format rule specifies at least some of the non-VCL NAL units in the sample of the base track to be placed in the video unit before or after NAL units in the one or more subpicture track;
wherein the format rule specifies the order of the non-VCL NAL units regardless of a presence of a picture header NAL unit in the sample.

12. The apparatus of claim 11, wherein the format rule further specifies that, in case that there is a set of one or more non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, NAL units in the sample up to and excluding a first NAL unit of the one or more non-VCL NAL units are placed in the video unit before the NAL units in the one or more subpicture tracks.

13. The apparatus of claim 11, wherein the format rule further specifies that, in case that there is no non-VCL NAL unit in the sample that has a unit type that is equal to EOS_NUT, EOB_NUT, SUFFIX_APS_NUT, SUFFIX_SEI_NUT, FD_NUT, or RSV_NVCL_27, all NAL units in the sample are placed in the video unit before the NAL units in the one or more subpicture tracks.

14. The apparatus of claim 11, wherein the format rule further specifies that, in case that there is at least one non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, all NAL units in the sample are placed in the video unit after the NAL units in the one or more subpicture tracks.

15. A non-transitory computer-readable storage medium storing instructions that cause a processor to:
perform a conversion between visual media data and a visual media file that includes one or more tracks that store one or more bitstreams of the visual media data according to a format rule;
wherein the visual media file includes a base track that references one or more subpicture tracks,
wherein the format rule specifies an order of non-VCL (video coding layer) NAL (network abstraction layer) units in a sample of the base track in reconstructing a video unit from the sample of the base track and samples in the one or more subpicture tracks, and wherein the format rule specifies at least some of the non-VCL NAL units in the sample of the base track to be placed in the video unit before or after NAL units in the one or more subpicture track;

wherein the format rule specifies the order of the non-VCL NAL units regardless of a presence of a picture header NAL unit in the sample.

16. The non-transitory computer-readable storage medium of claim 15, wherein the format rule further specifies that, in case that there is a set of one or more non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, NAL units in the sample up to and excluding a first NAL unit of the set of the one or more non-VCL NAL units are placed in the video unit before the NAL units in the one or more subpicture tracks.

17. A non-transitory computer-readable recording medium storing instructions that cause a processor to:
generating a visual media file that includes one or more tracks that store one or more bitstreams of visual media data according to a format rule;
wherein the visual media file includes a base track that references one or more subpicture tracks,
wherein the format rule specifies an order of non-VCL (video coding layer) NAL (network abstraction layer) units in a sample of the base track in reconstructing a video unit from the sample of the base track and samples in the one or more subpicture tracks, and
wherein the format rule specifies at least some of the non-VCL NAL units in the sample of the base track to be placed in the video unit before or after NAL units in the one or more subpicture track;
wherein the format rule specifies the order of the non-VCL NAL units regardless of a presence of a picture header NAL unit in the sample.

18. The non-transitory computer-readable recording medium of claim 17, wherein the format rule further specifies that, in case that there is a set of one or more non-VCL NAL unit in the sample that has a NAL unit type that is equal to EOS_NUT, EOB_NUT, SUFFIX_APS_NUT, SUFFIX_SEI_NUT, FD_NUT, or RSV_NVCL_27, NAL units in the sample up to and excluding a first NAL unit of the set of the one or more non-VCL NAL units are placed in the video unit before the NAL units in the one or more subpicture tracks.

* * * * *